United States Patent
Lalgudi et al.

(10) Patent No.: US 10,945,452 B2
(45) Date of Patent: Mar. 16, 2021

(54) MITIGATION OF ANTI-NUTRITIONAL SUBSTANCES IN PLANT MEAL

(71) Applicant: Ohio Soybean Council, Worthington, OH (US)

(72) Inventors: Ramanathan S. Lalgudi, Westerville, OH (US); Robert J. Cain, Lewis Center, OH (US); Barry L. McGraw, Westerville, OH (US)

(73) Assignee: Ohio Soybean Council, Worthington, OH (US)

( * ) Notice: Subject to any disclaimer, the term of this patent is extended or adjusted under 35 U.S.C. 154(b) by 459 days.

(21) Appl. No.: 14/725,804

(22) Filed: May 29, 2015

(65) Prior Publication Data

US 2015/0342221 A1 Dec. 3, 2015

Related U.S. Application Data

(60) Provisional application No. 62/004,706, filed on May 29, 2014.

(51) Int. Cl.
*A23K 50/80* (2016.01)
*A23K 20/142* (2016.01)
(Continued)

(52) U.S. Cl.
CPC .............. *A23K 50/80* (2016.05); *A23K 10/12* (2016.05); *A23K 10/14* (2016.05); *A23K 10/18* (2016.05);
(Continued)

(58) Field of Classification Search
CPC ........ A23K 10/14; A23K 10/18; A23K 10/22; A23K 10/30; A23K 10/12; A23K 40/00;
(Continued)

(56) References Cited

U.S. PATENT DOCUMENTS 3,401,039 A * 9/1968 Gordon ................ A23K 20/105
426/2
3,539,686 A * 11/1970 Rosenberg ........... A23K 20/179
424/760
(Continued)

FOREIGN PATENT DOCUMENTS

| CH | 559516 A5 | 3/1975 |
| CN | 101822347 A | 9/2010 |

(Continued)

OTHER PUBLICATIONS

Machine translation of CN 101828655B.*
(Continued)

*Primary Examiner* — C. Sayala
(74) *Attorney, Agent, or Firm* — Greer, Burns & Crain, Ltd.

(57) ABSTRACT

Improved meals, improved meal compositions, and improved aquaculture feed compositions are provided based on plant meal, wherein anti-nutritional effects of one or more anti-nutritional substances (ANS) are mitigated. Also provided are methods for making and using the improved meals, improved meal compositions, and improved aquaculture feed compositions. Also provided are kits using the improved meals, improved meal compositions, and improved aquaculture feed composition. The improved meals, improved meal compositions, and improved aquaculture feed compositions demonstrate that plant meal protein digestibility may be improved, for example, for replacing fish meal protein.

15 Claims, 8 Drawing Sheets

(51) Int. Cl.

| | | |
|---|---|---|
| *A23K 10/18* | (2016.01) | |
| *A23K 10/12* | (2016.01) | |
| *A23K 20/189* | (2016.01) | |
| *A23K 20/158* | (2016.01) | |
| *A23K 20/163* | (2016.01) | |
| *A23K 40/00* | (2016.01) | |
| *A23K 10/14* | (2016.01) | |
| *A23K 10/22* | (2016.01) | |
| *A23K 10/30* | (2016.01) | |
| *A23L 11/30* | (2016.01) | |

(52) U.S. Cl.
CPC .............. *A23K 10/22* (2016.05); *A23K 10/30* (2016.05); *A23K 20/142* (2016.05); *A23K 20/158* (2016.05); *A23K 20/163* (2016.05); *A23K 20/189* (2016.05); *A23K 40/00* (2016.05); *A23L 11/33* (2016.08); *A23L 11/35* (2016.08); *A23L 11/37* (2016.08); *A23Y 2220/29* (2013.01); *A23Y 2240/75* (2013.01); *A23Y 2300/00* (2013.01); *Y02A 40/818* (2018.01)

(58) Field of Classification Search
CPC .. A23K 20/189; A23K 20/163; A23K 20/158; A23K 20/142; A23K 50/80; A23L 11/37; A23L 11/33; A23L 11/35; Y02A 40/818; A23Y 2220/29; A23Y 2240/75; A23Y 2300/00
See application file for complete search history.

(56) References Cited

U.S. PATENT DOCUMENTS

| | | | | |
|---|---|---|---|---|
| 3,908,025 | A * | 9/1975 | Miller | A23K 40/20 426/623 |
| 3,984,576 | A * | 10/1976 | Burkwall, Jr. | A23K 50/45 426/104 |
| 4,551,335 | A | 11/1985 | Canella et al. | |
| 5,100,679 | A * | 3/1992 | Delrue | A23C 11/06 426/44 |
| 6,783,778 | B1 * | 8/2004 | Schmidt | A23K 40/20 426/2 |
| 7,960,148 | B2 | 6/2011 | Steer et al. | |
| 2002/0090418 | A1 | 7/2002 | Prevost et al. | |
| 2003/0035822 | A1 * | 2/2003 | Tricarico | C12N 1/16 424/442 |
| 2004/0219268 | A1 * | 11/2004 | Hogoy | B01J 13/14 426/460 |
| 2006/0240165 | A1 * | 10/2006 | Geach | A23K 40/10 426/573 |
| 2007/0231450 | A1 * | 10/2007 | Coleman | A23G 3/44 426/634 |
| 2009/0259018 | A1 * | 10/2009 | Barrows | C12P 7/06 530/300 |
| 2010/0124586 | A1 * | 5/2010 | Becker | A61K 9/5073 426/61 |
| 2014/0037786 | A1 | 2/2014 | Legarth | |
| 2015/0030637 | A1 * | 1/2015 | Romero Ormazabal | C12R 1/465 424/282.1 |

FOREIGN PATENT DOCUMENTS

| | | | | |
|---|---|---|---|---|
| CN | 101874547 | A * | 11/2010 | |
| CN | 102396652 | A | 4/2012 | |
| CN | 102669447 | B | 12/2013 | |
| CN | 103704522 | A * | 4/2014 | |
| EP | 0081262 | A2 | 6/1983 | |
| EP | 0479596 | A1 | 4/1992 | |
| EP | 1145648 | A1 | 10/2001 | |
| JP | S58212771 | A | 12/1983 | |
| JP | 5268881 | A | 10/1993 | |
| JP | H05268881 | H | 10/1993 | |
| JP | 2001346521 | A | 12/2001 | |
| JP | 2004504043 | A | 2/2004 | |
| JP | 2007020555 | A | 2/2007 | |
| JP | 2007529993 | A | 11/2007 | |
| JP | 2010227128 | A | 10/2010 | |
| JP | 2013070668 | A * | 4/2013 | |
| RU | 2025018 | C1 * | 12/1994 | |
| RU | 2025081 | C1 | 12/1994 | |
| WO | 2010007883 | A1 | 1/2010 | |
| WO | WO 2011031020 | A2 * | 3/2011 | ............ A23K 10/12 |
| WO | 2013096369 | A1 | 6/2013 | |
| WO | WO 2013114282 | A2 * | 8/2013 | ............ C12R 1/465 |
| WO | 2014016398 | A1 | 1/2014 | |

OTHER PUBLICATIONS

Machine translation of CN 102283327A.*
Machine translation of RU 2025018C1 (Year: 1994).*
International Search Report and Written Opinion of related application PCT/US15/33308, dated Aug. 10, 2015.
English abstract of CH559516 [online] [retrieved on Oct. 14, 2015]. Retrieved from the European Patent Office website using Internet <URL: http://worldwide.espacenet.com/>.
English abstract of CN101822347 [online] [retrieved on Oct. 14, 2015]. Retrieved from the European Patent Office website using Internet <URL: http://worldwide.espacenet.com/>.
English abstract of CN102396652 [online] [retrieved on Oct. 14, 2015]. Retrieved from the European Patent Office website using Internet <URL: http://worldwide.espacenet.com/>.
English abstract of CN102669447 [online] [retrieved on Oct. 14, 2015]. Retrieved from the European Patent Office website using Internet <URL: http://worldwide.espacenet.com/>.
English abstract of JP5268881 [online] [retrieved on Oct. 14, 2015]. Retrieved from the European Patent Office website using Internet <URL: http://worldwide.espacenet.com/>.
European office action for corresponding patent application No. 16154858.1 dated Jul. 23, 2018.
European search report for corresponding patent application No. 15728717.8-1106 dated May 31, 2018.
Tousi-Mojarrad, Mohaddeseh, Short communication. Effect of soybean meal heat procedures on growth performance of broiler chickens, Spanish Journal of Agricultural Research, 2014,12(1), 180-185.

* cited by examiner

| Diets | Modification | Comments |
|---|---|---|
| 1 | Control | Fish meal (major source of protein) |
| 2 | RSBM50 | 50% fish meal protein replaced by RSBM |
| 3 | RSBM50 + Enzyme | 50% fish meal protein replaced by RSBM + enzymes (cocktail) |
| 4 | RSBM100 | 100% fish meal protein replaced by RSBM |
| 5 | RSBM100 + Enzyme | 100% fish meal protein replaced by RSBM + enzymes (cocktail) |
| 6 | SPC50 | 50% fish meal protein replaced by soy protein concentrate |
| 7 | SPC50 + Enzyme | 50% fish meal protein replaced by soy protein concentrate + enzymes (cocktail) |
| 8 | SPC100 | 100% fish meal protein replaced by soy protein concentrate |
| 9 | SPC100 + Enzyme | 100% fish meal protein replaced by soy protein concentrate + enzymes (cocktail) |

FIG. 5

Composition of the experimental diets (% dry matter basis of ingredients) containing roasted soybean meal (SBM) and soy protein concentrate (SPC)

Experimental diets

| Ingredients | Diet 1 Control | Diet 2 SBM₅₀ | Diet 3 SBM₁₀₀ | Diet 4 SBM₅₀ + Enzyme | Diet 5 SBM₁₀₀ + Enzyme | Diet 6 SPC₅₀ | Diet 7 SPC₁₀₀ | Diet 8 SPC₅₀ + Enzyme | Diet 9 SPC₁₀₀ + Enzyme |
|---|---|---|---|---|---|---|---|---|---|
| Fish meal | 48.0 | 24.0 | - | 24.0 | - | 24.0 | - | 24.0 | - |
| Wheat meal | 34.8 | 21.9 | 9.0 | 21.9 | 9 | 28.4 | 21.8 | 28.4 | 21.8 |
| Soybean meal | - | 32.5 | 65.0 | 32.5 | 65.0 | - | - | - | - |
| Soy protein concentrate | - | - | - | - | - | 26.9 | 53.8 | 26.9 | 53.8 |
| Soy protein isolate | - | 1.6 | 2.8 | 1.6 | 2.8 | 0.7 | 1.2 | 0.7 | 1.2 |
| Menhaden oil | 5.0 | 7.8 | 10.7 | 7.8 | 10.7 | 7.8 | 10.7 | 7.8 | 10.7 |
| Soybean oil | 5.0 | 5.0 | 5.0 | 5.0 | 5.0 | 5.0 | 5.0 | 5.0 | 5.0 |
| Vitamin premix | 3 | 3.0 | 3.0 | 3.0 | 3.0 | 3.0 | 3.0 | 3.0 | 3.0 |
| Mineral premix | 4.0 | 4.0 | 4.0 | 4.0 | 4.0 | 4.0 | 4.0 | 4.0 | 4.0 |
| TiO₂ | 0.2 | 0.2 | 0.2 | 0.2 | 0.2 | 0.2 | 0.2 | 0.2 | 0.2 |
| Methionine | - | - | 0.3 | - | 0.3 | - | 0.3 | - | 0.3 |
| Cocktail enzyme | - | - | - | Yes | Yes | - | - | Yes | Yes |
| Total | 100 | 100 | 100 | 100 | 100 | 100 | 100 | 100 | 100 |

FIG. 6

MITIGATION OF ANTI-NUTRITIONAL SUBSTANCES IN PLANT MEAL

CROSS-REFERENCE TO RELATED APPLICATIONS

This application claims priority from U.S. Provisional Patent Application No. 62/004,706, filed on May 29, 2014, which is incorporated by reference herein in its entirety.

BACKGROUND

There is much current interest in the food industry in plant-based protein concentrates from, for example, soybeans, corn, wheat, and other protein containing grains. Plant meal may be conventionally extracted with alcohol to remove carbohydrates. The extraction process may increase the amount of protein, but may be inefficient or ineffective at removing non-digestible matter conventionally referred to in the field as Anti-Nutritional Substances (ANS). Plant-based meal may include ANS such as trypsin inhibitors, antigens (glycinin and b-conglycinin), phytic acid, and non-digestible oligosaccharides such as stachyose and raffinose. Stachyose and raffinose may be the most challenging ANS to remove from plant-based meal products.

Further, for example, conventional chemical methods of separating ANS polysaccharides from soybean meal typically may remove only half of such polysaccharides. For example, conventional processes may convert soybean meal containing about 50% proteins and about 40% polysaccharides into a soy protein concentrate containing about 70% proteins and about 20% polysaccharides. Biochemical processes such as microbial and enzymatic degradation may convert polysaccharides to oligosaccharides or more soluble sugars, but such processes may cause hydrolytic cleavage of proteins (e.g., in soybean meal), resulting in degraded protein and lower nutritional value.

An example use of plant-based meal limited by the presence of ANS is in aquaculture feed. Protein in conventional aquaculture feed is based on fish meal, which is costly and has an undesirable environmental impact. It is desirable to supplement or replace fish meal in aquaculture feed with plant-based meal, such as conventional soy protein concentrate. However, conventional soy protein concentrate still includes ANS, e.g., non-digestible oligosaccharides such as stachyose and raffinose, which are poorly digested by many fish, lead to impaired growth, and may be rejected, especially by carnivorous fish such as cod or salmon. In addition, undesirable "fishy" or "earthy" flavors may develop. Consequently, the amount of fish meal that can be replaced by plant matter such as conventional soy protein concentrate is limited by ANS.

The present disclosure appreciates that improving plant meal by removing anti-nutritional substances may be a challenging endeavor.

SUMMARY

In one embodiment, a method for producing an improved meal is provided. The method may include providing a plant meal. The plant meal may include a protein and one or more anti-nutritional substances (ANS). The method may include forming the improved meal from the plant meal by mitigating an anti-nutritional effect of the ANS included by the plant meal. The mitigating may include at least partly oxidizing the one or more ANS or a biochemically digested portion of the one or more ANS. Additionally or alternatively, the mitigating may include at least partly biochemically digesting the one or more ANS or an oxidized portion of the one or more ANS. Additionally or alternatively, the mitigating may include combining the plant meal with one or more enzymes. The one or more enzymes may be selected to at least partially biochemically digest, in a subject upon ingestion of the improved meal, the one or more ANS or the oxidized or the biochemically digested portion of the one or more ANS.

In another embodiment, an improved meal composition is provided. The improved meal composition may include a plant meal. An effect of ANS derived from the plant meal may be mitigated in the improved meal composition.

In another embodiment, an improved meal composition is provided. The improved meal composition may include an improved meal. The improved meal composition may include a plant meal. The plant meal may be modified to form the improved meal by mitigating an effect, e.g., anti-nutritional effect, of one or more ANS compared to an unmodified plant meal. The effect of one or more ANS may be mitigated by the plant meal being reduced in one or more ANS compared to the unmodified plant meal. The plant meal may be reduced in the one or more ANS by a process. The process may include at least partly oxidizing the one or more ANS, e.g., to produce one or more oxidized ANS. The process may include at least partly biochemically digesting the one or more ANS, e.g., to produce one or more biochemically digested ANS. The process may include at least partly oxidizing the one or more biochemically digested ANS. The improved meal may be reduced in the one or more ANS by at least about 10 weight percent compared to the unmodified plant meal.

In one embodiment, an improved aquaculture feed composition is provided. The improved aquaculture feed composition may include an improved meal derived from a plant meal. An effect of one or more ANS derived from the plant meal may be mitigated in the improved meal. The improved aquaculture feed composition may include a fish meal.

In another embodiment, a method for aquaculture is provided. The method for aquaculture may include providing an organism for aquaculture. The method for aquaculture may include feeding the aquacultured organism an improved aquaculture feed composition. The improved aquaculture feed composition may include an improved meal derived from a plant meal. An effect of one or more ANS derived from the plant meal may be mitigated in the improved meal. For example, the plant meal in the improved meal may be modified compared to an unmodified plant meal to mitigate an effect of one or more ANS. The improved aquaculture feed composition may include a fish meal.

In one embodiment, a kit for aquaculture is provided. The kit may include an improved aquaculture feed composition. The improved aquaculture feed composition may include an improved meal derived from a plant meal. An effect of one or more ANS derived from the plant meal may be mitigated in the improved meal. The improved aquaculture feed composition may include a fish meal. The kit may also include instructions. The instructions may include feeding the improved aquaculture feed composition to an aquacultured organism.

In another embodiment, a method for producing an improved meal is provided. The method may include providing a plant meal, the plant meal including a protein and one or more anti-nutritional substances (ANS). The method may include forming the improved meal from the plant meal by mitigating an anti-nutritional effect of the ANS comprised by the plant meal. The anti-nutritional effect of the ANS comprised by the plant meal may be mitigated by at least partly oxidizing the one or more ANS or a biochemically digested portion of the one or more ANS. The anti-nutritional effect of the ANS comprised by the plant meal may be mitigated by at least partly biochemically digesting the one or more ANS or an oxidized portion of the one or more ANS. The anti-nutritional effect of the ANS comprised by the plant meal may be mitigated by combining the plant meal with one or more enzymes selected to at least partially biochemically digest, in a subject upon ingestion of the improved meal, the one or more ANS or the oxidized or the biochemically digested portion of the one or more ANS.

In one embodiment, an improved meal composition is provided. The improved meal composition may include an improved meal. The improved meal may be derived from a plant meal. The plant meal may be modified to form the improved meal by mitigating an effect of one or more ANS compared to an unmodified plant meal. The effect of the one or more ANS may be mitigated by the plant meal being reduced in the one or more ANS compared to the unmodified plant meal. The plant meal may be reduced n the one or more ANS compared to the unmodified plant meal by one or more of: a process including at least partly oxidizing the one or more ANS; and a process including at least partly biochemically digesting the one or more ANS. The improved meal may be reduced in the one or more ANS by at least about 10 weight percent compared to the unmodified plant meal.

In another embodiment, a method for aquaculture is provided. The method may include providing an organism for aquaculture. The method may include feeding the aquacultured organism an improved meal composition. The improved meal composition may include an improved meal derived from a plant meal. The plant meal may be modified to mitigate an effect of one or more anti-nutritional substances (ANS) compared to an unmodified plant meal.

BRIEF DESCRIPTION OF THE DRAWINGS

The accompanying figures, which are incorporated in and constitute a part of the specification, illustrate example methods and apparatuses, and are used merely to illustrate example embodiments.

FIG. 5 is a table 500 showing outlines of various control and example diets.

FIG. 6 is a table 600 showing composition details of various control and example diets.

DETAILED DESCRIPTION

Figure 1:
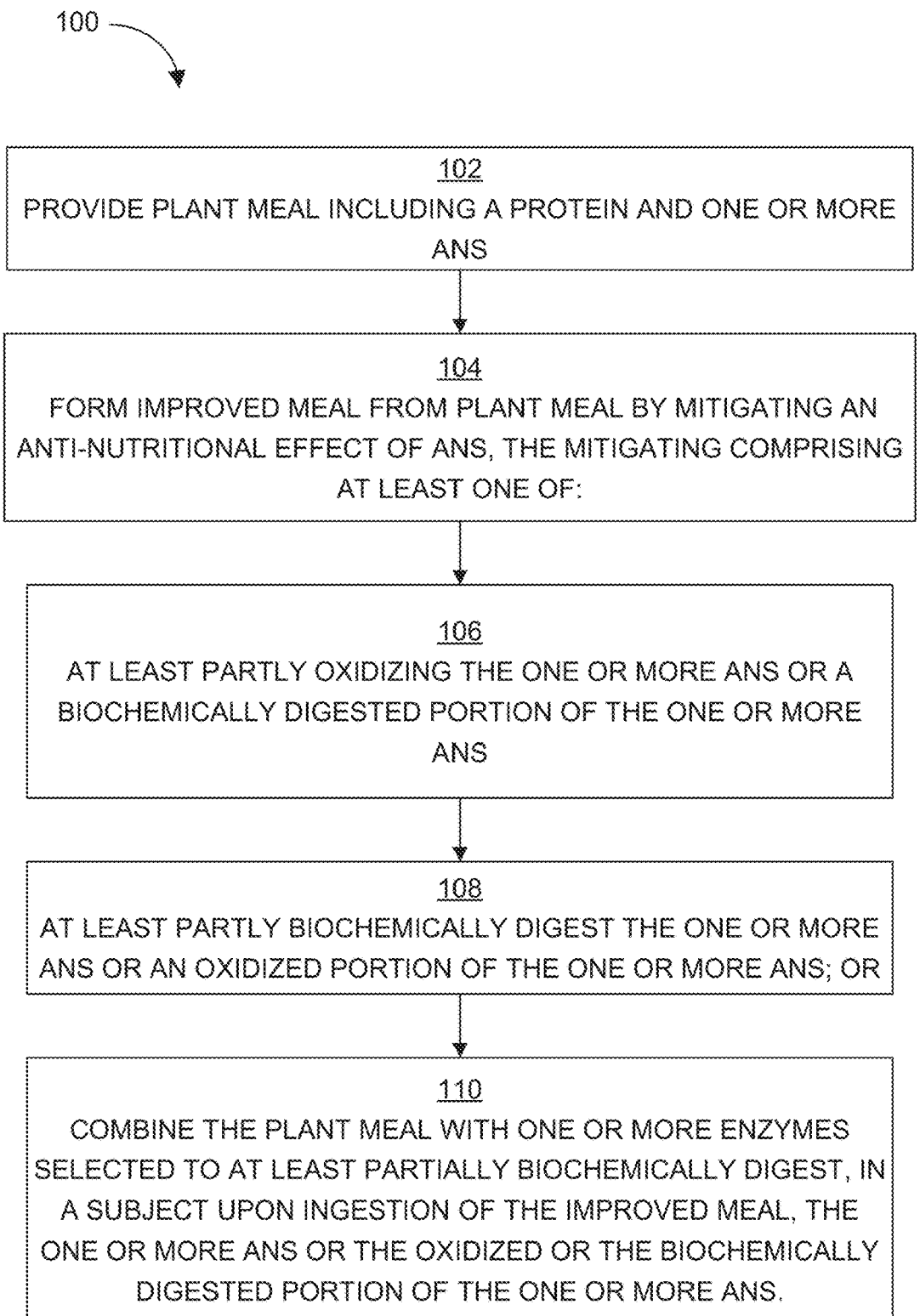
FIG. 1 depicts a flow chart of an example method 100 for producing an improved meal.
Figure 2:
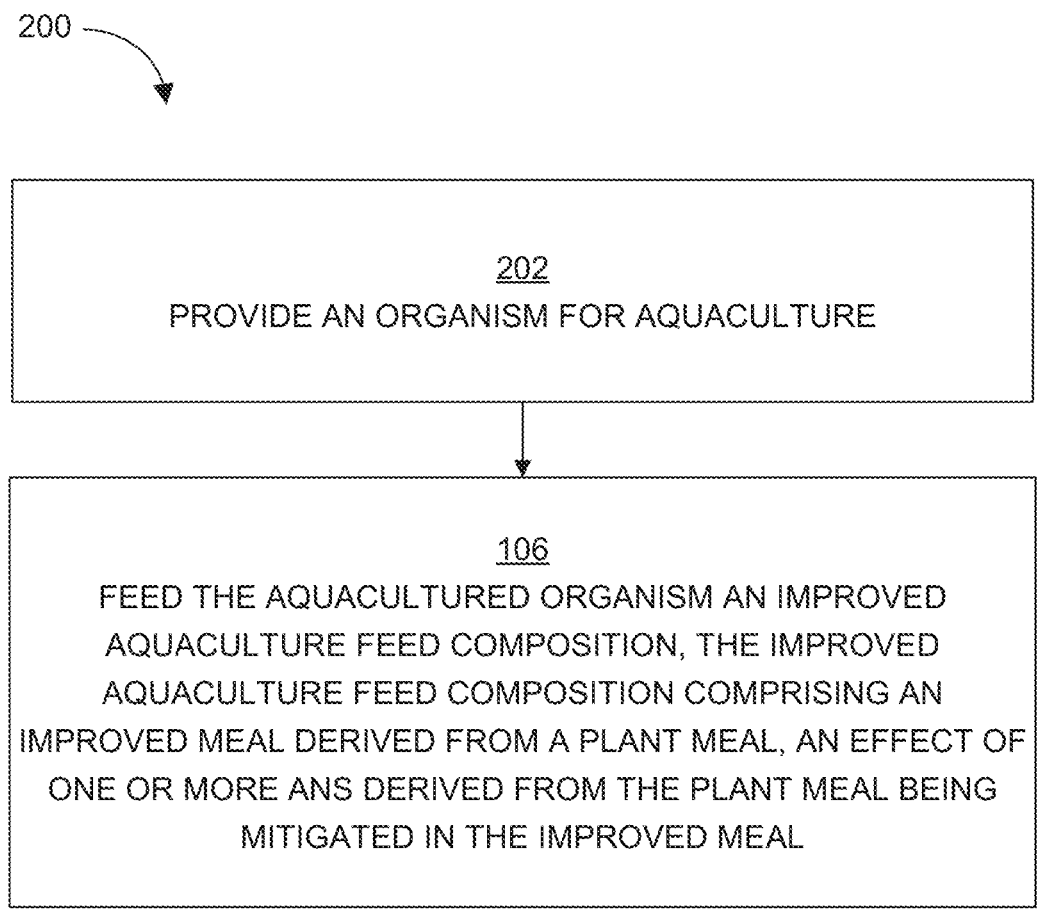
FIG. 2 depicts a flow chart of an example method 200 for aquaculture.

In various embodiments, a method for producing an improved meal is provided. FIG. 1 depicts a flow chart of an example method 100 for producing an improved meal. Method 100 may include 102 providing a plant meal. The plant meal may include a protein and one or more anti-nutritional substances (ANS). Method 100 may include forming the improved meal from the plant meal by 104 mitigating an anti-nutritional effect of the ANS included by the plant meal. The mitigating may include 106 at least partly oxidizing the one or more ANS or a biochemically digested portion of the one or more ANS. Additionally or alternatively, the mitigating may include 108 at least partly biochemically digesting the one or more ANS or an oxidized portion of the one or more ANS. Additionally or alternatively, the mitigating may include 110 combining the plant meal with one or more enzymes. The one or more enzymes may be selected to at least partially biochemically digest, in a subject upon ingestion of the improved meal, the one or more ANS or the oxidized or the biochemically digested portion of the one or more ANS.

As used herein, an unmodified plant meal may include a protein and one or more anti-nutritional substances (ANS). As used herein, an "improved meal" may include the unmodified plant meal wherein the effect of the one or more ANS may be mitigated.

As used herein, mitigation of the one or more ANS may include reduction of the amount of ANS in the improved meal compared to the unmodified plant meal by any method or process described herein, for example, oxidizing the ANS, biochemically digesting the ANS by bacterial fermentation, biochemically digesting the ANS by enzymatic digestion, and the like.

As used herein, mitigation of the one or more ANS may additionally or alternatively include reduction of the effect of ANS in the improved meal compared to the unmodified plant meal by inclusion of one or more enzymes and/or one or more bacterial species. The one or more enzymes and/or one or more bacterial species may be selected effective to cause corresponding biochemical digestion of the ANS in a subject upon ingestion.

As used herein, an improved meal composition may include the improved meal and one or more additional components, for example, fish meal. For example, one improved meal composition is the aquaculture feed composition described herein, which may include the improved meal and the fish meal.

In some embodiments the mitigating may include at least partly oxidizing the one or more ANS or a biochemically digested portion of the one or more ANS; and at least partly biochemically digesting the one or more ANS or an oxidized portion of the one or more ANS. The mitigating may include at least partly oxidizing the one or more ANS before at least partly biochemically digesting the one or more ANS or an oxidized portion of the one or more ANS. The mitigating may include at least partly biochemically digesting the one or more ANS before at least partly oxidizing the one or more ANS or a biochemically digested portion of the one or more ANS.

In several embodiments, forming the improved meal may further include separating from the protein at least one of the oxidized portion of the one or more ANS or the biochemically digested portion of the one or more ANS to form the improved meal. Forming the improved meal may also include separating from the protein the oxidized portion of the one or more ANS and the biochemically digested portion of the one or more ANS to form the improved meal. The oxidized portion and the biochemically digested portion may collectively correspond to a weight percent of at least about 5, 10, 15, 20, 25, 30, 35, 40, 45, 50, 55, 60, 65, 70, 75, 80, 85, 90, 95, 99, or 100. The weight percent may be determined with respect to the one or more ANS included by the plant meal prior to conducting the method on the plant meal. For example, the oxidized portion and the biochemically digested portion may collectively correspond to at least about 25 weight percent of the one or more ANS included by the plant meal. The oxidized portion and the biochemically digested portion may collectively correspond to at least about 35 weight percent of the one or more ANS included by the plant meal. The oxidized portion and the biochemically digested portion may collectively correspond to at least about 40 weight percent of the one or more ANS included by the plant meal. The oxidized portion and the biochemically digested portion may collectively correspond to at least about 50 weight percent of the one or more ANS included by the plant meal.

In various embodiments, the oxidizing the one or more ANS may include oxidizing a weight percent of the one or more ANS included by the plant meal. The oxidized weight percent of the one or more ANS included by the plant meal may be a weight percent of at least about 5, 10, 15, 20, 25, 30, 35, 40, 45, 50, 55, 60, 65, 70, 75, 80, 85, 90, 95, 99, or 100. For example, the oxidizing the one or more ANS may include oxidizing at least about 15 weight percent of the one or more ANS included by the plant meal. Forming the improved meal may include separating the oxidized portion of the one or more ANS from the protein to form the improved meal. For example, separating the oxidized portion of the one or more ANS from the protein may include separating the oxidized portion of the one or more ANS corresponding to at least about 15 weight percent of the one or more ANS included by the plant meal.

In some embodiments, the oxidizing the one or more ANS may include one or more of: chemical oxidation, electrochemical oxidation, photochemical oxidation, oxygen plasma oxidation, or enzymatic oxidation. For example, the oxidizing the one or more ANS may include employing one or more oxidation agents, e.g., one or more of ozone, hydrogen peroxide, Fehling's reagent, manganese oxide, silver (I) oxide, silver (II) oxide, and Fenton's reagent, and the like. Further, for example, the oxidizing the one or more ANS may include contacting the plant meal with an oxidant in the presence of a catalyst. The catalyst may include any oxidation catalyst, for example, an oxide of one or more of: Al, Sn, Mn, Cu, Cr, Ti, Zr, Ni, Co, and Fe, and the like. Oxidizing the one or more ANS may include selectively oxidizing the one or more ANS in the presence of the protein included by the plant meal, for example, using hydrogen peroxide as described in the Examples herein.

In several embodiments, the oxidizing the one or more ANS may include photochemical oxidation upon irradiation at a wavelength from about 170 nm to about 270 nm, e.g., about 200 nm, in the presence of oxygen. In some embodiments, the oxidizing the one or more ANS may include contacting the one or more ANS with an oxygen plasma.

In various embodiments, oxidizing the one or more ANS may include: providing the plant meal in the form of an aqueous solution or slurry and contacting the aqueous solution or slurry with an oxidant. Oxidizing the one or more ANS may include heating the aqueous solution or slurry and the oxidant to a temperature between about 25° C. and about 120° C. Further, for example, oxidizing the one or more ANS may include: providing the plant meal in the form of an aqueous solution or slurry; contacting the aqueous solution or slurry with an oxidant; and pressurizing the aqueous solution or slurry and the oxidant to a pressure between about 30 pounds per square inch (PSI) and about 300 PSI. Oxidizing the one or more ANS may include heating the aqueous solution or slurry and the oxidant to a temperature between about 25° C. and about 120° C. and pressurizing the aqueous solution or slurry and the oxidant to a pressure between about 30 PSI and about 300 PSI.

In some embodiments, forming the improved meal may include separating the biochemically digested portion of the one or more ANS from the protein to form the improved meal.

In several embodiments, biochemically digesting the one or more ANS may include contacting an aqueous slurry of the plant meal with at least one carbohydrase enzyme under conditions effective to cause enzymatic digestion of at least a portion of the one or more ANS. For example, the biochemically digesting the one or more ANS may include contacting the plant meal with at least one enzyme under conditions effective to cause enzymatic digestion of any weight percent of the one or more ANS included by the plant meal described herein. For example, the at least one enzyme may cause digestion of a weight percent of the one or more ANS of at least about one or more of: 10, 15, 25, 30, 35, 40, 45, 50, 60, 70, 80, 90, or 100, e.g., at least about 25 weight percent of the one or more ANS included by the plant meal. Further, for example, an enzymatically digested portion of the ANS may be formed by the biochemically digesting the one or more ANS. The method may also include separating the enzymatically digested portion of the one or more ANS from the protein. The enzymatically digested portion of the one or more ANS may correspond to any weight percent of the one or more ANS included by the plant meal described herein, e.g., at least about 25 weight percent of the one or more ANS included by the plant meal.

In various embodiments, the biochemically digesting the one or more ANS may include contacting the plant meal with an enzyme cocktail. As used herein, an "enzyme cocktail" may include at least one or more enzymes, e.g., two or more enzymes. For example, the enzyme cocktail may include one or more of: arabanase, cellulase, β-glucanase, hemicellulase, xylanase, alpha galactosidase, or invertase. The enzyme cocktail may include, e.g., arabanase, cellulase, β-glucanase, hemicellulase, and xylanase, e.g., VISCOZYME® (Sigma-Aldrich, St. Louis, Mo.). The enzyme cocktail may include, e.g., alpha galactosidase and invertase, e.g., BEANO® (Prestige Brands, Irvington, N.Y.). The enzyme cocktail may include one or more of: an immobilized enzyme, a microencapsulated enzyme, and the like.

In some embodiments, the biochemically digesting the one or more ANS may include bacterially fermenting a portion of the one or more ANS included by the plant meal. For example, biochemically digesting the one or more ANS may include bacterially fermenting any weight percent of the one or more ANS included by the plant meal described herein. For example, For example, the bacterially fermenting may cause biochemical digestion of a weight percent of the one or more ANS of at least about one or more of: 10, 15, 25, 30, 35, 40, 45, 50, 60, 70, 80, 90, or 100, e.g., at least about 10 weight percent. A bacterially fermented portion of the one or more ANS may be formed by biochemically digesting the one or more ANS. Forming the improved meal may include separating the bacterially fermented portion of the one or more ANS from the protein. Further, for example, a bacterially fermented portion of the one or more ANS may be formed by biochemically digesting the one or more ANS. Forming the improved meal may include separating the bacterially fermented portion of the one or more ANS from the protein. The bacterially fermented portion of the one or more ANS may correspond to any weight percent of the one or more ANS included by the plant meal described herein, for example, at least about 10 weight percent.

In several embodiments, biochemically digesting the one or more ANS may include: contacting the plant meal with one or more bacteria from a yogurt culture; and bacterially fermenting a portion of the one or more ANS included by the plant meal. The one or more bacteria may include any species of *Lactobacillus*. The one or more bacteria may include one or more of *lactobacillus delbrueckii* subsp. *bulgaricus*, *Streptococcus thermophiles*, or *Bifidobacteria*.

In some embodiments, the oxidized portion of the ANS or the biochemically digested portion of the ANS may include one or more soluble components. Forming the improved meal may include separating at least a portion of the one or more soluble components from the protein to produce the improved meal. For example, separating at least a portion of the one or more soluble components from the protein to produce the improved meal may include supercritical extraction of the one or more soluble components. Separating at least a portion of the one or more soluble components from the protein to produce the improved meal may include electrophoretic separation of the protein and the one or more soluble components. Separating at least a portion of the one or more soluble components from the protein to produce the improved meal may include extraction of the one or more soluble components with one or more of: water, a polar organic solvent, and a supercritical solvent. For example, the polar organic solvent may include one or more of methanol, ethanol, 1-propanol, 2-propanol, 1-butanol, sec-butanol, tert-butanol, acetone, methyl ethyl ketone, acetonitrile, dimethyl sulfoxides, N,N-dimethyl formamide, N,N-dimethyl acetamide, acetic anhydride, acetic acid, N-methyl-2-pyrrolidone, and N-ethyl-2-pyrrolidone, and the like. The supercritical solvent may include, for example, supercritical water, supercritical carbon dioxide, and the like.

In several embodiments, the improved meal may include one or more nutritional substances by oxidizing or biochemically digesting the one or more ANS. For example, oxidizing or biochemically digesting an oligosaccharide included by the one or more ANS may produce various digestible sugars. The improved meal may include one or more nutritionally neutral substances prepared from the one or more ANS. For example, oxidizing or biochemically digesting an oligosaccharide included by the one or more ANS may produce various shorter oligosaccharides which may be neither nutritional nor anti-nutritional.

In various embodiments, the plant meal may include an optionally roasted meal of one or more of: soybean, wheat, maize, millet, sorghum, barley, oats, rice, rye, teff, triticale, wild rice, buckwheat, amaranth, quinoa, chickpeas, common beans, common peas, fava beans, lentils, lima beans, lupins, mung beans, peanuts, pigeon peas, runner beans, or oil-expressed algal matter. For example, oil-expressed algal matter may include algae from which oil has been at least partly removed, and which may optionally be at least partly dried. The plant meal may include an optionally roasted meal of one or more of: soybean, chickpeas, common beans, common peas, fava beans, lentils, lima beans, lupins, mung beans, peanuts, pigeon peas, runner beans, or oil-expressed algal matter. For example, the plant meal may include optionally roasted soybean meal. The plant meal may include any plant matter that includes ANS, for example, a cruciferous vegetable.

In some embodiments, the one or more ANS may include one or more oligosaccharides, e.g., trisaccharides, tetrasaccharides, and the like. For example, the one or more ANS may include one or more of: arabinose xylose, galactose, glucose, sucrose, stachyose or raffinose. In some examples, the one or more ANS may include one or more of: stachyose or raffinose.

In several embodiments, forming the improved meal may include contacting a fish meal to the protein to form an improved meal composition. The improved meal or improved meal composition may be, for example, an improved aquaculture feed. The improved meal composition may include the fish meal and the improved meal in any dry matter weight ratio, for example, about 1:20, 2:20, 3:20, 4:20, 5:20, 6:20, 7:20, 8:20, 9:20, 10:20, 11:20, 12:20, 13:20, 14:20, 15:20, 16:20, 17:20, 18:20, 19:20, 20:20, 20:19, 20:18, 20:17, 20:16, 20:15, 20:14, 20:13, 20:12, 20:11, 20:10, 20:9, 20:8, 20:7, 20:6, 20:5, 20:4, 20:3, 20:2, or 20:1, or between any two of the preceding ratios. For example, the improved meal may include the fish meal and the improved meal in a dry matter weight ratio of between about 1:20 and about 20:1, between about 1:2 and about 2:1, between about 4:5 and about 5:4, and the like.

In various embodiments, the subject may be any animal which may consume the improved meal and which may benefit from the improved meal compared to the plant meal. For example, the subject may be: a mammal, e.g., a cow, pig, rabbit, mouse, rat, human, or the like; a bird, e.g., a chicken, turkey, duck, goose, ornamental bird, or the like; a reptile, e.g., a lizard, snake, or the like. In some examples, the subject may be, for example, a fish or a crustacean, e.g., the subject may be an aquacultured organism. For example, the subject may be: a carp, e.g., grass carp, silver carp, catla (indian carp), common carp, bighead carp, crucian carp, roho labeo, and the like; a salmonid, e.g., atlantic salmon, king salmon, chinook salmon, steelhead, rainbow trout, lake trout, sea trout, and the like; a tilapia, e.g., nile tilapia, Mozambique tilapia, and the like; grouper, e.g., greasy grouper, mullet, e.g., flathead grey mullet; catfish, e.g., Pangas catfish, river catfish, and the like; perch, e.g., yellow perch, surf perch, walleye, and the like; croaker, e.g., large yellow croaker; amberjack, e.g., Japanese amberjack; Barramundi; seabream, e.g., gilthead seabream, silver seabream, and the like; goby, e.g., marble goby; ornamental or tropical fish; seabass, e.g., Japanese seabass, European seabass, striped seabass, and the like; and the like. In some examples, the subject may be a crustacean, e.g., a prawn or shrimp, for example, crustaceans of the groups Caridea or Dendrobranchiata. Examples may include *Litopenaeus vannamei* (Pacific white shrimp), *Penaeus monodon* (giant tiger prawn), *Macrobrachium rosenbergii* (giant river prawn), and the like.

In various embodiments, an improved meal composition is provided. The improved meal composition may include a plant meal. An effect of one or more ANS derived from the plant meal may be mitigated in the improved meal composition.

In various embodiments, an improved meal composition is provided. The improved meal composition may include the improved meal described herein. The improved meal may include a plant meal modified to form the improved meal by mitigating an effect of one or more ANS derived from the plant meal. The terms 'derived from a plant meal' may also be referred to as an unmodified plant meal, e.g., the plant meal may be modified to form the improved meal by mitigating an effect of one or more ANS compared to an unmodified plant meal. The effect of one or more ANS may be mitigated by the plant meal being reduced in one or more ANS compared to the unmodified plant meal by a process. The process may include at least partly oxidizing the one or more ANS. The process may include at least partly biochemically digesting the one or more ANS. The process may include at least partly oxidizing a biochemically digested one or more ANS. The improved meal may be reduced by any weight percent of the one or more ANS included by the plant meal described herein. For example, the improved meal may be reduced compared to the plant meal by a weight percent of the one or more ANS of at least about one or more of: 10, 15, 25, 30, 35, 40, 45, 50, 60, 70, 80, 90, or 100, e.g., at least about 10 weight percent.

For example, the effect of one or more ANS may be mitigated where the plant meal may be reduced in the one or more ANS compared to the plant meal in unmitigated form. The term 'unmitigated form' may also be referred to as an unmodified plant meal. As used herein, the plant meal in "unmitigated form" or "unmodified plant meal" means the plant meal prior to oxidizing or biochemically digesting the one or more ANS, or contacting the plant meal with an oxidizing agent, an enzyme, a bacteria, or the like. The plant meal may be reduced in the one or more ANS compared to the unmodified plant meal in unmitigated form by a process including at least partly oxidizing the one or more ANS or a biochemically digested portion of the one or more ANS, e.g., as described herein. The plant meal may be reduced in the one or more ANS compared to the unmodified plant meal in unmitigated form by a process including at least partly biochemically digesting the one or more ANS or an oxidized portion of the one or more ANS, e.g., as described herein.

In some embodiments, the improved meal composition may include one or more enzymes capable of at least partly digesting the one or more ANS upon ingestion of the improved meal composition by a subject. For example, the effect of at least partly digesting the one or more ANS by the one or more enzymes may be such that effect of the one or more ANS derived from the plant meal may be mitigated in the improved meal, e.g., the effect of one or more ANS may be reduced compared to an unmodified plant meal.

In several embodiments, the improved meal may be reduced in the one or more ANS derived from the plant meal by a weight percent compared to the unmodified plant meal or plant meal in unmitigated form. For example, the improved meal may be reduced in the one or more ANS derived from the plant meal by a weight percent compared to the unmodified plant meal of about or at least about 5, 10, 15, 20, 25, 30, 35, 40, 45, 50, 55, 60, 65, 70, 75, 80, 85, 90, 95, 99, or 100. For example, the improved meal may be reduced in the one or more ANS derived from the plant meal by a weight percent of at least about 10, 25, 35, 40, or 50.

In various embodiments, the improved meal composition may include one or more enzymes, for example, a carbohydrase. In various embodiments, the improved meal composition may include an enzyme cocktail. For example, the enzyme cocktail may include one or more of: arabanase, cellulase, β-glucanase, hemicellulase, xylanase, alpha galactosidase, or invertase. The enzyme cocktail may include, e.g., arabanase, cellulase, β-glucanase, hemicellulase, and xylanase, e.g., VISCOZYME® (Sigma-Aldrich, St. Louis, Mo.). The enzyme cocktail may include, e.g., alpha galactosidase and invertase, e.g., BEANO® (Prestige Brands, Irvington, N.Y.). The enzyme cocktail may include one or more of: an immobilized enzyme, a microencapsulated enzyme, and the like.

In some embodiments, the improved meal composition may include one or more bacteria from a yogurt culture. For example, the one or more bacteria may include *lactobacillus*. The one or more bacteria may include one or more of *lactobacillus delbrueckii* subsp. *bulgaricus, streptococcus thermophiles*, or *bifidobacteria*.

In several embodiments, the improved meal composition may include an improved meal including one or more nutritional substances prepared by oxidizing or biochemically digesting the one or more ANS. For example, oxidizing or biochemically digesting an oligosaccharide included by the one or more ANS may produce various digestible sugars. The improved meal composition may include an improved meal including one or more nutritionally neutral substances prepared from the one or more ANS. For example, oxidizing or biochemically digesting an oligosaccharide included by the one or more ANS may produce various shorter oligosaccharides which may be neither nutritional nor anti-nutritional in a given subject.

In various embodiments, the plant meal may include an optionally roasted meal of one or more of: soybean, wheat, maize, millet, sorghum, barley, oats, rice, rye, teff, triticale, wild rice, buckwheat, amaranth, quinoa, chickpeas, common beans, common peas, fava beans, lentils, lima beans, lupins, mung beans, peanuts, pigeon peas, runner beans, or oil-expressed algal matter. The plant meal may include an optionally roasted meal of one or more of: soybean, chickpeas, common beans, common peas, fava beans, lentils, lima beans, lupins, mung beans, peanuts, pigeon peas, runner beans, or oil-expressed algal matter. For example, the plant meal may include optionally roasted soybean meal. The plant meal may include any plant matter that includes ANS, for example, a cruciferous vegetable.

In some embodiments, the one or more ANS may include one or more oligosaccharides, e.g., trisaccharides, tetrasaccharides, and the like. For example, the one or more ANS may include one or more of: arabinose xylose, galactose, glucose, sucrose, stachyose or raffinose. In some examples, the one or more ANS may include one or more of: stachyose or raffinose.

In various embodiments, the improved meal composition may include soy protein concentrate. The improved meal composition may include soy protein concentrate and one or more enzymes capable of at least partly digesting the one or more ANS upon ingestion of the improved meal by a subject such that the effect of the one or more ANS derived from the plant meal is mitigated in the subject. The improved meal may include roasted soybean meal. For example, the improved meal composition may include roasted soybean meal and one or more enzymes capable of at least partly digesting the one or more ANS upon ingestion of the improved meal by a subject such that the effect of the one or more ANS derived from the plant meal is mitigated in the subject.

In some embodiments, the improved meal composition may include a fish meal. For example, the improved meal or improved meal composition may be an improved aquaculture feed. The improved meal composition may include the fish meal and the improved meal in any dry matter weight ratio, for example, about 1:20, 2:20, 3:20, 4:20, 5:20, 6:20, 7:20, 8:20, 9:20, 10:20, 11:20, 12:20, 13:20, 14:20, 15:20, 16:20, 17:20, 18:20, 19:20, 20:20, 20:19, 20:18, 20:17, 20:16, 20:15, 20:14, 20:13, 20:12, 20:11, 20:10, 20:9, 20:8, 20:7, 20:6, 20:5, 20:4, 20:3, 20:2, or 20:1, or between any two of the preceding ratios. For example, the improved meal composition may include the fish meal and the improved meal in a dry matter weight ratio of between about 1:20 and about 20:1, between about 1:2 and about 2:1, between about 4:5 and about 5:4, and the like.

In various embodiments, an improved aquaculture feed composition is provided. The improved aquaculture feed composition may include an improved meal derived from a plant meal. An effect of one or more ANS derived from the plant meal may be mitigated in the improved meal, e.g., an effect of one or more ANS may be reduced in the improved meal compared to an unmodified plant meal. The improved aquaculture feed composition may include, for example, a fish meal. The improved aquaculture feed composition may be an improved meal composition.

In some embodiments, the improved aquaculture feed composition, e.g., the improved meal included therein, may be reduced in an amount of the one or more ANS compared to the plant meal in unmitigated form. For example, the improved meal may be prepared from the plant meal by a process including at least partly oxidizing the one or more ANS or a biochemically digested portion of the one or more ANS. Alternatively or in addition, the improved meal may be prepared from the plant meal by a process including at least partly biochemically digesting the one or more ANS or an oxidized portion of the one or more ANS.

In several embodiments, the improved aquaculture feed composition, e.g., the improved meal included therein, may include one or more enzymes capable of at least partly digesting the one or more ANS upon ingestion of the improved aquaculture feed composition by an aquacultured organism. The one or more enzymes may at least partly digesting the one or more ANS in the aquacultured organism such that the effect of the one or more ANS derived from the plant meal is mitigated in the aquacultured organism.

In some embodiments, the aquacultured organism may be a fish or a crustacean. For example, the aquacultured organism may be: a carp, e.g., grass carp, silver carp, catla (indian carp), common carp, bighead carp, crucian carp, roho labeo, and the like; a salmonid, e.g., atlantic salmon, king salmon, chinook salmon, steelhead, rainbow trout, lake trout, sea trout, and the like; a tilapia, e.g., nile tilapia, Mozambique tilapia, and the like; grouper, e.g., greasy grouper, mullet, e.g., flathead grey mullet; catfish, e.g., Pangas catfish, river catfish, and the like; perch, e.g., yellow perch, surf perch, walleye, and the like; croaker, e.g., large yellow croaker; amberjack, e.g., Japanese amberjack; Barramundi; seabream, e.g., gilthead seabream, silver seabream, and the like; goby, e.g., marble goby; ornamental or tropical fish; seabass, e.g., Japanese seabass, European seabass, striped seabass, and the like; and the like. In some examples, the aquacultured organism may be a crustacean, e.g., a prawn or shrimp, for example, crustaceans of the groups Caridea or Dendrobranchiata. Examples may include *Litopenaeus vannamei* (Pacific white shrimp), *Penaeus monodon* (giant tiger prawn), *Macrobrachium rosenbergii* (giant river prawn), and the like. Moreover, the aquacultured organism may be native to fresh, brackish, or salt water, or may be anadromous, such as a salmonid.

In various embodiments, the improved aquaculture feed composition, e.g., the improved meal included therein, may be reduced in the one or more ANS derived from the plant meal by a weight percent compared to the unmodified plant meal in unmitigated form. For example, the improved meal may be reduced in the one or more ANS derived from the plant meal by a weight percent compared to the unmodified plant meal in unmitigated form of about or at least about 5, 10, 15, 20, 25, 30, 35, 40, 45, 50, 55, 60, 65, 70, 75, 80, 85, 90, 95, 99, or 100. For example, the improved meal may be reduced in the one or more ANS derived from the plant meal by a weight percent of at least about 10, 25, 35, 40, or 50.

In various embodiments, the improved aquaculture feed composition, e.g., the improved meal included therein, may include one or more enzymes, for example, at least one carbohydrase. For example, the improved aquaculture feed composition may include an enzyme cocktail. The enzyme cocktail may include, e.g., one or more of: arabanase, cellulase, β-glucanase, hemicellulase, xylanase, alpha galactosidase, or invertase. The enzyme cocktail may include, e.g., arabanase, cellulase, β-glucanase, hemicellulase, and xylanase, e.g., VISCOZYME® (Sigma-Aldrich, St. Louis, Mo.). The enzyme cocktail may include, e.g., alpha galactosidase and invertase, e.g., BEANO® (Prestige Brands, Irvington, N.Y.). further including an enzyme cocktail, the enzyme cocktail including one or more of: alpha galactosidase and invertase. The enzyme cocktail may include one or more of: an immobilized enzyme, a microencapsulated enzyme, and the like.

In some embodiments, the improved aquaculture feed composition, e.g., the improved meal included therein, may include one or more bacteria from a yogurt culture. For example, the one or more bacteria may include *lactobacillus*. The one or more bacteria may include one or more of *lactobacillus delbrueckii* subsp. *bulgaricus, streptococcus thermophiles*, or *bifidobacteria*.

In several embodiments, the improved aquaculture feed composition, e.g., the improved meal included therein, may include one or more nutritional substances prepared by oxidizing or biochemically digesting the one or more ANS. For example, oxidizing or biochemically digesting an oligosaccharide included by the one or more ANS may produce various digestible sugars. The improved meal may include one or more nutritionally neutral substances prepared from the one or more ANS. For example, oxidizing or biochemically digesting an oligosaccharide included by the one or more ANS may produce various shorter oligosaccharides which may be neither nutritional nor anti-nutritional in a given subject.

In various embodiments, the improved aquaculture feed composition, e.g., the improved meal included therein and the plant meal from which the improved meal is prepared may include various components. For example, the improved meal may include an optionally roasted meal of one or more of: soybean, wheat, maize, millet, sorghum, barley, oats, rice, rye, teff, triticale, wild rice, buckwheat, amaranth, quinoa, chickpeas, common beans, common peas, fava beans, lentils, lima beans, lupins, mung beans, peanuts, pigeon peas, runner beans, or oil-expressed algal matter. The improved meal may include an optionally roasted meal of one or more of: soybean, chickpeas, common beans, common peas, fava beans, lentils, lima beans, lupins, mung beans, peanuts, pigeon peas, runner beans, or oil-expressed algal matter. For example, the plant meal may include optionally roasted soybean meal. The improved meal may include any plant matter that includes ANS, for example, a cruciferous vegetable.

In some embodiments, the one or more ANS may include one or more oligosaccharides, e.g., trisaccharides, tetrasaccharides, and the like. For example, the one or more ANS may include one or more of: arabinose xylose, galactose, glucose, sucrose, stachyose or raffinose. In some examples, the one or more ANS may include one or more of: stachyose or raffinose.

In various embodiments, the improved aquaculture feed composition, e.g., the improved meal included therein, may include soy protein concentrate. The improved meal may include soy protein concentrate and one or more enzymes capable of at least partly digesting the one or more ANS upon ingestion of the improved meal by a subject such that the effect of the one or more ANS derived from the plant meal is mitigated in the subject. The improved meal may include roasted soybean meal. For example, the improved meal may include roasted soybean meal and one or more enzymes capable of at least partly digesting the one or more ANS upon ingestion of the improved meal by a subject such that the effect of the one or more ANS derived from the plant meal is mitigated in the subject.

In some embodiments, the improved aquaculture feed composition may include a fish meal. The improved aquaculture feed composition may include the fish meal and the improved meal in any dry matter weight ratio, for example, about 1:20, 2:20, 3:20, 4:20, 5:20, 6:20, 7:20, 8:20, 9:20, 10:20, 11:20, 12:20, 13:20, 14:20, 15:20, 16:20, 17:20, 18:20, 19:20, 20:20, 20:19, 20:18, 20:17, 20:16, 20:15, 20:14, 20:13, 20:12, 20:11, 20:10, 20:9, 20:8, 20:7, 20:6, 20:5, 20:4, 20:3, 20:2, or 20:1, or between any two of the preceding ratios. For example, the improved aquaculture feed composition may include the fish meal and the improved meal in a dry matter weight ratio of between about 1:20 and about 20:1, between about 1:2 and about 2:1, between about 4:5 and about 5:4, and the like.

In several embodiments, the improved aquaculture feed composition may include one or more other components. For example, the improved aquaculture feed composition may include one or more of optionally roasted soybean meal, wheat meal, soy protein concentrate, or soy protein isolate. The improved aquaculture feed composition may include one or more of a fish oil or soybean oil. The fish oil may include, for example, menhaden oil, sardine oil, anchovy oil, salmon oil, oil derived from by-catch, and the like. The improved aquaculture feed composition may include one or more amino acids in free or salt form, e.g., free methionine. The improved aquaculture feed composition may include a vitamin premix. The improved aquaculture feed composition may include a mineral premix. The improved aquaculture feed composition may include a coloring or tracking agent, such as titanium dioxide.

In various embodiments, the improved aquaculture feed composition may include any of the components mentioned herein in any combination. For example, the improved aquaculture feed composition may include in combination: a fish meal and the improved meal in a dry matter weight ratio of between about 1:20 and about 20:1; one or more of optionally roasted soybean meal, wheat meal, soy protein concentrate, or soy protein isolate; one or more of a fish oil or soybean oil; methionine; and one or more enzymes capable of at least partly digesting the one or more ANS upon ingestion of the improved aquaculture feed composition by an aquacultured organism such that the effect of the one or more ANS derived from the plant meal is mitigated in the aquacultured organism. In another example, the improved aquaculture feed composition may include in combination: a fish meal and the improved meal in a dry matter weight ratio of between about 4:5 and about 5:4; soy protein concentrate or soy protein isolate; one or more of a fish oil or soybean oil; methionine; and an enzyme cocktail including two or more enzymes, e.g., two or more of: arabanase, cellulase, β-glucanase, hemicellulase, xylanase, alpha galactosidase, or invertase. The enzyme cocktail may include one or more of: an immobilized enzyme, a microencapsulated enzyme, and the like.

In another embodiment, a method 200 for aquaculture is provided. The method for aquaculture may include 202 providing an organism for aquaculture. The method for aquaculture may include 204 feeding the aquacultured organism an improved aquaculture feed composition. The improved aquaculture feed may also be referred to as an improved meal composition. The improved aquaculture feed composition or improved meal composition may include an improved meal derived from a plant meal. The plant meal may be modified to mitigate an effect of one or more ANS derived from the plant meal, e.g., the plant meal may be modified to reduce an effect of one or more ANS compared to an unmodified plant meal. The improved aquaculture feed composition may include a fish meal.

In some embodiments, the organism provided in the method for aquaculture may be a fish or a crustacean. For example, the aquacultured organism may be: a carp, e.g., grass carp, silver carp, catla (indian carp), common carp, bighead carp, crucian carp, roho labeo, and the like; a salmonid, e.g., atlantic salmon, king salmon, chinook salmon, steelhead, rainbow trout, lake trout, sea trout, and the like; a tilapia, e.g., nile tilapia, Mozambique tilapia, and the like; grouper, e.g., greasy grouper, mullet, e.g., flathead grey mullet; catfish, e.g., Pangas catfish, river catfish, and the like; perch, e.g., yellow perch, surf perch, walleye, and the like; croaker, e.g., large yellow croaker; amberjack, e.g., Japanese amberjack; Barramundi; seabream, e.g., gilthead seabream, silver seabream, and the like; goby, e.g., marble goby; ornamental or tropical fish; seabass, e.g., Japanese seabass, European seabass, striped seabass, and the like; and the like. In some examples, the aquacultured organism may be a crustacean, e.g., a prawn or shrimp, for example, crustaceans of the groups Caridea or Dendrobranchiata. Examples may include *Litopenaeus vannamei* (Pacific white shrimp), *Penaeus monodon* (giant tiger prawn), *Macrobrachium rosenbergii* (giant river prawn), and the like. Moreover, the aquacultured organism may be native to fresh, brackish, or salt water, or may be anadromous, such as a salmonid.

In various embodiments, the improved aquaculture feed composition employed in the method for aquaculture may include any improved aquaculture feed composition or improved meal composition described herein.

For example, in some embodiments, the method for aquaculture may employ the improved aquaculture feed composition, e.g., the improved meal included therein, reduced in an amount of the one or more ANS compared to the plant meal in unmitigated form. For example, the improved meal may be prepared from the plant meal by a process including at least partly oxidizing the one or more ANS or a biochemically digested portion of the one or more ANS. Alternatively or in addition, the improved meal may be prepared from the plant meal by a process including at least partly biochemically digesting the one or more ANS or an oxidized portion of the one or more ANS.

In several embodiments, the method for aquaculture may employ the improved aquaculture feed composition, e.g., the improved meal included therein, including one or more enzymes capable of at least partly digesting the one or more ANS upon ingestion of the improved aquaculture feed composition by an aquacultured organism. The one or more enzymes may at least partly digesting the one or more ANS in the aquacultured organism such that the effect of the one or more ANS derived from the plant meal is mitigated in the aquacultured organism.

In various embodiments, the method for aquaculture may employ the improved aquaculture feed composition, e.g., the improved meal included therein, reduced in the one or more ANS derived from the plant meal by a weight percent compared to the plant meal in unmitigated form. For example, the improved meal may be reduced in the one or more ANS derived from the plant meal by a weight percent compared to the plant meal in unmitigated form of about or at least about 5, 10, 15, 20, 25, 30, 35, 40, 45, 50, 55, 60, 65, 70, 75, 80, 85, 90, 95, 99, or 100. For example, the improved meal may be reduced in the one or more ANS derived from the plant meal by a weight percent of at least about 10, 25, 35, 40, or 50.

In various embodiments, the method for aquaculture may employ the improved aquaculture feed composition, e.g., the improved meal included therein, including one or more enzymes, for example, at least one carbohydrase. For example, the improved aquaculture feed composition may include an enzyme cocktail. The enzyme cocktail may include, e.g., one or more of: arabanase, cellulase, β-glucanase, hemicellulase, xylanase, alpha galactosidase, or invertase. The enzyme cocktail may include, e.g., arabanase, cellulase, β-glucanase, hemicellulase, and xylanase, e.g., VISCOZYME® (Sigma-Aldrich, St. Louis, Mo.). The enzyme cocktail may include, e.g., alpha galactosidase and invertase, e.g., BEANO® (Prestige Brands, Irvington, N.Y.) further including an enzyme cocktail, the enzyme cocktail including one or more of: alpha galactosidase and invertase. The enzyme cocktail may include one or more of: an immobilized enzyme, a microencapsulated enzyme, and the like.

In some embodiments, the method for aquaculture may employ the improved aquaculture feed composition, e.g., the improved meal included therein, including one or more bacteria from a yogurt culture. For example, the one or more bacteria may include *lactobacillus*. The one or more bacteria may include one or more of *lactobacillus delbrueckii* subsp. *bulgaricus, streptococcus thermophiles*, or *bifidobacteria*.

In several embodiments, the method for aquaculture may employ the improved aquaculture feed composition, e.g., the improved meal included therein, including one or more nutritional substances prepared by oxidizing or biochemically digesting the one or more ANS. For example, oxidizing or biochemically digesting an oligosaccharide included by the one or more ANS may produce various digestible sugars. The improved meal may include one or more nutritionally neutral substances prepared from the one or more ANS. For example, oxidizing or biochemically digesting an oligosaccharide included by the one or more ANS may produce various shorter oligosaccharides which may be neither nutritional nor anti-nutritional in a given subject.

In various embodiments, the method for aquaculture may employ the improved aquaculture feed composition, e.g., the improved meal included therein, and the plant meal from which the improved meal is prepared may include various components. For example, the improved meal may include an optionally roasted meal of one or more of: soybean, wheat, maize, millet, sorghum, barley, oats, rice, rye, teff, triticale, wild rice, buckwheat, amaranth, quinoa, chickpeas, common beans, common peas, fava beans, lentils, lima beans, lupins, mung beans, peanuts, pigeon peas, runner beans, or oil-expressed algal matter. The improved meal may include an optionally roasted meal of one or more of: soybean, chickpeas, common beans, common peas, fava beans, lentils, lima beans, lupins, mung beans, peanuts, pigeon peas, runner beans, or oil-expressed algal matter. For example, the plant meal may include optionally roasted soybean meal. The improved meal may include any plant matter that includes ANS, for example, a cruciferous vegetable.

In some embodiments, the one or more ANS may include one or more oligosaccharides, e.g., trisaccharides, tetrasaccharides, and the like. For example, the one or more ANS may include one or more of: arabinose xylose, galactose, glucose, sucrose, stachyose or raffinose. In some examples, the one or more ANS may include one or more of: stachyose or raffinose.

In various embodiments, the method for aquaculture may employ the improved aquaculture feed composition, e.g., the improved meal included therein, including soy protein concentrate. The improved meal may include soy protein concentrate and one or more enzymes capable of at least partly digesting the one or more ANS upon ingestion of the improved meal by a subject such that the effect of the one or more ANS derived from the plant meal is mitigated in the subject, e.g., the improved meal may be reduced in the effect of the one or more ANS compared to an unmodified plant meal. The improved meal may include roasted soybean meal. For example, the improved aquaculture feed composition may include roasted soybean meal and one or more enzymes capable of at least partly digesting the one or more ANS upon ingestion of the improved meal by a subject such that the effect of the one or more ANS derived from the plant meal is mitigated in the subject.

In some embodiments, the method for aquaculture may employ the improved aquaculture feed composition, e.g., the improved meal included therein, including a fish meal. The improved aquaculture feed composition may include the fish meal and the improved meal in any dry matter weight ratio, for example, about 1:20, 2:20, 3:20, 4:20, 5:20, 6:20, 7:20, 8:20, 9:20, 10:20, 11:20, 12:20, 13:20, 14:20, 15:20, 16:20, 17:20, 18:20, 19:20, 20:20, 20:19, 20:18, 20:17, 20:16, 20:15, 20:14, 20:13, 20:12, 20:11, 20:10, 20:9, 20:8, 20:7, 20:6, 20:5, 20:4, 20:3, 20:2, or 20:1, or between any two of the preceding ratios. For example, the improved aquaculture feed composition may include the fish meal and the improved meal in a dry matter weight ratio of between about 1:20 and about 20:1, between about 1:2 and about 2:1, between about 4:5 and about 5:4, and the like.

In several embodiments, the method for aquaculture may employ the improved aquaculture feed composition, e.g., the improved meal included therein, including one or more other components. For example, the improved aquaculture feed composition may include one or more of optionally roasted soybean meal, wheat meal, soy protein concentrate, or soy protein isolate. The improved aquaculture feed composition may include one or more of a fish oil or soybean oil. The fish oil may include, for example, menhaden oil, sardine oil, anchovy oil, salmon oil, oil derived from by-catch, and the like. The improved aquaculture feed composition may include one or more amino acids in free or salt form, e.g., free methionine. The improved aquaculture feed composition may include a vitamin premix. The improved aquaculture feed composition may include a mineral premix. The improved aquaculture feed composition may include a coloring or tracking agent, such as titanium dioxide.

In various embodiments, the method for aquaculture may employ the improved aquaculture feed composition, e.g., the improved meal included therein, any of the components mentioned herein in any combination. For example, the improved aquaculture feed composition may include in combination: a fish meal and the improved meal in a dry matter weight ratio of between about 1:20 and about 20:1; one or more of optionally roasted soybean meal, wheat meal, soy protein concentrate, or soy protein isolate; one or more of a fish oil or soybean oil; methionine; and one or more enzymes capable of at least partly digesting the one or more ANS upon ingestion of the improved aquaculture feed composition by an aquacultured organism such that the effect of the one or more ANS derived from the plant meal is mitigated in the aquacultured organism. In another example, the improved aquaculture feed composition may include in combination: a fish meal and the improved meal in a dry matter weight ratio of between about 4:5 and about 5:4; soy protein concentrate or soy protein isolate; one or more of a fish oil or soybean oil; methionine; and an enzyme cocktail including two or more enzymes, e.g., two or more of: arabanase, cellulase, β-glucanase, hemicellulase, xylanase, alpha galactosidase, or invertase. The enzyme cocktail may include one or more of: an immobilized enzyme, a microencapsulated enzyme, and the like.

In various embodiments, a kit for aquaculture is provided. The kit may include an improved aquaculture feed composition, e.g., the improved aquaculture feed composition or improved meal composition as described herein. The improved aquaculture feed composition in the kit may include an improved meal derived from a plant meal, e.g., the improved meal as described herein. An effect of one or more anti-nutritional substances (ANS) derived from the plant meal may be mitigated in the improved meal. The improved aquaculture feed composition may include a fish meal. The kit may also include instructions. The instructions may include feeding the improved aquaculture feed composition to an aquacultured organism. For example, the instructions may include feeding the improved aquaculture feed composition to fish or a crustacean, e.g., any fish or crustacean described herein. In another example, the instructions may include feeding the improved aquaculture feed composition to a carp, a salmonid, a tilapia, a grouper, a mullet, a catfish, a perch, a croaker, an amberjack, a seabream, a goby, an ornamental or tropical fish; a seabass, a prawn, or a shrimp.

In various embodiments, a method for producing an improved meal is provided. The method may include providing a plant meal, the plant meal including a protein and one or more anti-nutritional substances (ANS). The method may include forming the improved meal from the plant meal by mitigating an anti-nutritional effect of the ANS comprised by the plant meal. The anti-nutritional effect of the ANS comprised by the plant meal may be mitigated by at least partly oxidizing the one or more ANS or a biochemically digested portion of the one or more ANS. The anti-nutritional effect of the ANS comprised by the plant meal may be mitigated by at least partly biochemically digesting the one or more ANS or an oxidized portion of the one or more ANS. The anti-nutritional effect of the ANS comprised by the plant meal may be mitigated by combining the plant meal with one or more enzymes selected to at least partially biochemically digest, in a subject upon ingestion of the improved meal, the one or more ANS or the oxidized or the biochemically digested portion of the one or more ANS. In some embodiments, the improved meal may be an improved aquaculture feed.

In some embodiments, the method may include separating from the protein at least one of the oxidized portion of the one or more ANS or the biochemically digested portion of the one or more ANS. The separating may include one or more of: aqueous extraction, organic solvent extraction, supercritical extraction, and electrophoretic separation.

In several embodiments, oxidizing the one or more ANS may include one or more of: chemical oxidation, electrochemical oxidation, photochemical oxidation, oxygen plasma oxidation, and enzymatic oxidation. Oxidizing the one or more ANS comprising employing one or more of: ozone, hydrogen peroxide, Fehling's reagent, a metal oxide catalyst, manganese oxide, silver (I) oxide, silver (II) oxide, and Fenton's reagent. Oxidizing the one or more ANS may include providing the plant meal in the form of an aqueous solution or slurry. Oxidizing the one or more ANS may include contacting the aqueous solution or slurry with an oxidant. Oxidizing the one or more ANS may include heating the aqueous solution or slurry and the oxidant to a temperature between about 25° C. and about 120° C. Oxidizing the one or more ANS may include pressuring the aqueous solution or slurry and the oxidant to a pressure between about 30 PSI and about 300 PSI.

In various embodiments, biochemically digesting the one or more ANS may include providing the plant meal in the form of an aqueous solution or slurry. Biochemically digesting the one or more ANS may include contacting the plant meal with one or more of: carbohydrase, arabanase, cellulase, β-glucanase, hemicellulase, xylanase, alpha galactosidase, and invertase. biochemically digesting the one or more ANS may include fermenting a portion of the one or more ANS included by the plant meal by contacting the plant meal with a bacteria. The bacterial may include one or more of: *lactobacillus delbrueckii* subsp. *bulgaricus, streptococcus thermophiles,* and *bifidobacteria.*

In some embodiments, the plant meal may include an optionally roasted meal of one or more of: soybean, wheat, maize, millet, sorghum, barley, oats, rice, rye, teff, triticale, wild rice, buckwheat, amaranth, quinoa, chickpeas, common beans, common peas, fava beans, lentils, lima beans, lupins, mung beans, peanuts, pigeon peas, runner beans, cruciferous vegetables, and oil-expressed algal matter. The one or more ANS may include one or more of: oligosaccharides, arabinose, xylose, galactose, glucose, sucrose, stachyose, and raffinose.

In several embodiments, the method may include contacting a fish meal to the improved meal to form an improved meal composition. The improved meal composition may include the fish meal and the improved meal in a dry matter weight ratio of between about 1:20 and about 20:1. The improved meal composition may be an improved aquaculture feed.

In various embodiments, an improved meal composition is provided. The improved meal composition may include an improved meal. The improved meal may be derived from a plant meal. The plant meal may be modified to form the improved meal by mitigating an effect of one or more ANS compared to an unmodified plant meal. The effect of the one or more ANS may be mitigated by the plant meal being reduced in the one or more ANS compared to the unmodified plant meal. The plant meal may be reduced in the one or more ANS compared to the unmodified plant meal by one or more of: a process including at least partly oxidizing the one or more ANS; and a process including at least partly biochemically digesting the one or more ANS. Additionally or alternatively, in some embodiments, the plant meal may be reduced in the one or more ANS by a process including at least partly oxidizing a biochemically digested one or more ANS. The improved meal may be reduced in the one or more ANS by any weight percent described herein, for example, at least about 10 weight percent compared to the unmodified plant meal.

In some embodiments, the improved meal composition may include one or more enzymes capable of at least partly digesting the one or more ANS upon ingestion of the improved meal composition by a subject such that the effect of the one or more ANS derived from the unmodified plant meal is mitigated in the subject. The one or more enzymes may include one or more of: carbohydrase, arabanase, cellulase, β-glucanase, hemicellulase, xylanase, alpha galactosidase, and invertase. The improved meal composition may additionally or alternatively include a bacteria capable of fermenting the one or more ANS such that the effect of the one or more ANS derived from the unmodified plant meal is mitigated. The bacteria may include one or more of: *lacto-* bacillus, *lactobacillus delbrueckii* subsp. *bulgaricus*, *streptococcus thermophiles*, and *bifidobacteria*.

In several embodiments, the improved meal composition may include an optionally roasted meal of one or more of: soybean, wheat, maize, millet, sorghum, barley, oats, rice, rye, teff, triticale, wild rice, buckwheat, amaranth, quinoa, chickpeas, common beans, common peas, fava beans, lentils, lima beans, lupins, mung beans, peanuts, pigeon peas, runner beans, cruciferous vegetables, and oil-expressed algal matter. The one or more ANS may include one or more of: oligosaccharides, arabinose xylose, galactose, glucose, sucrose, stachyose and raffinose.

In several embodiments, the improved meal composition may include a fish meal. The fish meal and the improved meal may be in any dry matter weight ratio described herein, for example, a dry matter weight ratio of between about 1:20 and about 20:1. The improved meal composition may be an improved aquaculture feed.

In various embodiments, a method for aquaculture is provided. The method may include providing an organism for aquaculture. The method may include feeding the aquacultured organism an improved meal composition. The improved meal composition may include an improved meal derived from a plant meal. The plant meal may be modified to mitigate an effect of one or more anti-nutritional substances (ANS) compared to an unmodified plant meal.

In some embodiments, the effect of the one or more ANS may be mitigated by the plant meal being reduced in the one or more ANS compared to the unmodified plant meal. The plant meal may be reduced in the one or more ANS compared to the unmodified plant meal by one or more of: a process comprising at least partly oxidizing the one or more ANS; and a process comprising at least partly biochemically digesting the one or more ANS. Additionally or alternatively, in some embodiments, the plant meal may be reduced in the one or more ANS by a process including at least partly oxidizing a biochemically digested one or more ANS. The improved meal may be reduced in the one or more ANS by any weight percent described herein, for example, at least about 10 weight percent compared to the unmodified plant meal.

In several embodiments, the aquacultured organisms may include one or more of: a fish, a carp, a salmonid, a tilapia, a grouper, a mullet, a catfish, a perch, a croaker, an amberjack, a seabream, a goby, an ornamental or tropical fish; a seabass, a crustacean, a prawn, and a shrimp.

In some embodiments of the method, the improved meal composition may include one or more of: a fish oil; a soybean oil; methionine; and a fish meal. The fish meal and the improved meal in any dry matter weight ratio described herein, for example, a dry matter weight ratio of between about 1:20 and about 20:1. The improved meal composition may additionally or alternatively include one or more enzymes to at least partly digest the one or more ANS upon ingestion of the improved meal composition by the aquacultured organism such that the effect of the one or more ANS derived from the plant meal is mitigated in the aquacultured organism. The one or more enzymes may include one or more of: carbohydrase, arabanase, cellulase, β-glucanase, hemicellulase, xylanase, alpha galactosidase, and invertase. The improved meal composition may may additionally or alternatively include a bacteria capable of fermenting the one or more ANS such that the effect of the one or more ANS derived from the unmodified plant meal is mitigated. The bacteria may include one or more of: *lactobacillus*, *lactobacillus delbrueckii* subsp. *bulgaricus*, *streptococcus thermophiles*, and *bifidobacteria*.

In several embodiments of the method, the plant meal may include an optionally roasted meal of one or more of: soybean, wheat, maize, millet, sorghum, barley, oats, rice, rye, teff, triticale, wild rice, buckwheat, amaranth, quinoa, chickpeas, common beans, common peas, fava beans, lentils, lima beans, lupins, mung beans, peanuts, pigeon peas, runner beans, cruciferous vegetables, and oil-expressed algal matter. The one or more ANS may include one or more of: an oligosaccharide, arabinose, xylose, galactose, glucose, sucrose, stachyose and raffinose.

EXAMPLES

Example 1.0

Chemical Treatment of Soybean Meal with 1.5% Hydrogen Peroxide and Catalyst at Atmospheric Pressure A 3-neck 500 mL round bottom flask was fitted with: an overhead stirrer, using only glass and polytetrafluoroethylene stirring components; a polytetrafluoroethylene coated thermocouple; a heating mantle and heating mantle controller; a water cooled condenser; and a gas inlet for purging, coupled to an argon gas source. About 50.03 g of defatted soy flour (NUTRASOY® 7B, Archer Daniels Midland, Decatur, Ill.), 52.2 mg manganese oxide (cat#63548, Sigma-Aldrich, St. Louis, Mo.) and 235 g of steam distilled water was added to the flask to form a reaction mixture. The mixture was stirred and heated to 60° C. under an argon purge. When the mixture appeared as a uniform slurry, about 15.23 g of a 30% aqueous solution of hydrogen peroxide was added drop-wise while maintaining the temperature at 60° C. The reaction mixture was stirred at 60° C. for 1 hour, then allowed to cool to ambient temperature overnight while mixing. The resulting solution was a light tan color, similar in color to the starting reaction mixture.

Example 1.1

Procedure for Chemical Treatment of Soybean Meal with 1.5% Hydrogen Peroxide and Catalyst at High Temperature and Pressure A 100 mL pressure reactor (PARR, Moline, Ill.) was fitted with a stirrer and a gas inlet. About 33.33 g of defatted soy flour (NUTRASOY® 7B, Archer Daniels Midland, Decatur, Ill.), 35.2 mg manganese oxide (cat#63548, Sigma-Aldrich, St. Louis, Mo.) and about 156.67 g of steam distilled water was added to the reactor to form a reaction mixture. About 10.0 g of a 30% aqueous solution of hydrogen peroxide was added to the reaction mixture at once before closing the reactor cap. The reactor was charged with nitrogen gas at 222 pounds per square inch (PSI) then heated to 120° C. The reaction mixture was mixed at 120° C. for 1 hour, then the heating was removed and the reaction mixture was allowed to cool to room temperature while mixing. The resulting solution was jet black in color with a strong odor.

Example 1.2

Procedure for Chemical Treatment of Soybean Meal with ~1.5% Hydrogen Peroxide and Catalyst at Elevated Temperature and Pressure A 100 mL pressure reactor (PARR, Moline, Ill.) was fitted with a stirrer and a gas inlet. About 33.72 g of defatted soy flour (NUTRASOY® 7B, Archer Daniels Midland, Decatur, Ill.), 32.8 mg manganese oxide (cat#63548, Sigma-Aldrich, St. Louis, Mo.) and about 157.5 g of steam distilled water was added to the reactor to form a reaction mixture. The reaction mixture was made into a uniform slurry with no clumps using a homogenizer (IKA® Works Inc., Wilmington, N.C.). About 10.0037 g of a 30% aqueous solution of hydrogen peroxide was added to the reaction mixture at once before closing the reactor cap. The reactor was charged with nitrogen gas (about 240 PSI), then heated to 60° C. The reaction mixture was mixed at 60° C. for 1 hour, then the heating was removed, and the reaction mixture was allowed to cool to room temperature while mixing. The resulting tannish brown mixture was centrifuged to separate a supernatant fraction from a solid fraction. Both fractions were freeze-dried. The freeze-dried portion of the liquid fraction was about 11.32 g, and the freeze-dried portion of the solid fraction was about 15.31 g. These results indicate that about 42% of remaining solids were water soluble in the liquid fraction.

Example 2

Procedure for Chemical Treatment of Soybean Meal with ~0.75% Hydrogen Peroxide and Catalyst at Elevated Temperature and Pressure A 100 mL pressure reactor (PARR, Moline, Ill.) was fitted with a stirrer and a gas inlet. About 33.40 g of defatted soy flour (NUTRASOY® 7B, Archer Daniels Midland, Decatur, Ill.), 16.2 mg manganese oxide (cat#63548, Sigma-Aldrich, St. Louis, Mo.) and about 155.25 g of steam distilled water was added to the reactor to form a reaction mixture. The reaction mixture was made into a uniform slurry with no clumps using a homogenizer (IKA® Works Inc., Wilmington, N.C.). About 5.0218 g of a 30% aqueous solution of hydrogen peroxide was added to the reaction mixture at once before closing the reactor cap. The reactor was charged with nitrogen gas (about 243 PSI), then heated to 60° C. The reaction mixture was mixed at 60° C. for 1 hour, then the heating was removed and the reaction mixture was allowed to cool to room temperature while mixing. The resulting tannish brown mixture was centrifuged to separate a supernatant fraction from a solid fraction. Both fractions were freeze-dried. The freeze-dried portion of the liquid fraction was about 6.16 g, and the freeze-dried portion of the solid fraction was about 15.33 g. These results indicate that about 28% of remaining solids were water soluble in the liquid fraction.

Example 3

Treatment of Soybean Meal with Enzyme Cocktail

A 1 L reactor was fitted with an overhead stirrer, a thermocouple, a heating mantle with temperature controller, a water cooled condenser, and a homogenizer (IKA® Works Inc., Wilmington, N.C.). About 110.25 g of defatted soy flour (NUTRASOY® 7B, Archer Daniels Midland, Decatur, Ill.) and about 1 volumetric L of steam distilled water was added to the reactor to form a reaction mixture. The overhead stirrer was set to high to high to disperse the soy, and the homogenizer was set to a setting of 3. The pH of the reaction mixture was adjusted to 6.02 with glacial acetic acid by monitoring with a pH meter and slowly adding acid. An enzyme cocktail (about 0.51 g of a multi-enzyme complex containing a wide range of carbohydrases, including arabanase, cellulase, β-glucanase, hemicellulase, and xylanase; VISCOZYME® L, cat#V2010, Sigma-Aldrich, St. Louis, Mo.) was added to the mixture by drop-wise addition. The reactor was heated to 60° C. and allowed to mix for 22 hours. The resulting mixture was cooled to room temperature and centrifuged to separate a supernatant fraction from a solid fraction. Both fractions were freeze-dried. The freeze-dried portion of the solid fraction was about 74.99 g. These results indicate that about 25% of remaining solids were water soluble in the liquid fraction.

Example 4

Procedure for Treatment of Soybean Meal with Enzyme Cocktail of EXAMPLE 3, and Additionally, Alpha-Galactose and Invertase Enzymes A 1 L reactor was fitted with an overhead stirrer, a thermocouple, a heating mantle with temperature controller, a water cooled condenser, and a homogenizer (IKA® Works Inc., Wilmington, N.C.). About 110.65 g of defatted soy flour (NUTRASOY® 7B, Archer Daniels Midland, Decatur, Ill.), 16.2 mg manganese oxide (cat#63548, Sigma-Aldrich, St. Louis, Mo.) and about 1 volumetric L of steam distilled water was added to the reactor to form a reaction mixture. The overhead stirrer was set to high to disperse the soy, and the homogenizer was set to a setting of 3. The pH of the reaction mixture was adjusted to 6.02 with glacial acetic acid by monitoring with a pH meter and slowly adding acid. The reactor was charged with 4 tablets containing alpha-galactose and invertase enzymes (1.41 g, of BEANO®, Prestige Brands, Tarrytown, N.Y.). and the reaction mixture was stirred for three days. An enzyme cocktail (about 0.54 g of VISCOZYME® L, cat#V2010, Sigma-Aldrich, St. Louis, Mo.) was added to the mixture by drop-wise addition. The reactor was heated to 60° C. and allowed to mix for 22 hours. The resulting mixture was cooled to room temperature and allowed to mix for 2 days. The resulting mixture was centrifuged to separate a supernatant fraction from a solid fraction. Both fractions were freeze-dried. The freeze-dried portion of the solid fraction was about 56.54 g. These results indicate that about 36% of remaining solids were water-soluble in the liquid fraction.

Example 5A

Bulk Treatment of Soybean Meal to Produce Improved Meal

A 1 gallon pressure reactor was preheated to 60° C. and charged with a homogenized mixture of 578 g toasted soy flour, 2600 g of deionized water, and 5.5 g of manganese dioxide. The reactor was closed and the reactor bolts were tightened with a torque wrench. An addition vessel was charged with 170 g of 30% aqueous hydrogen peroxide and was fixed in-line with an inert gas inlet coupled to an argon source. The reactor was charged with 230 PSI of argon and the 30% aqueous hydrogen peroxide was forced into the reactor with the argon pressure. The reaction was stirred for 1 hour and then the produce was immediately removed from the pressure reactor.

Examples 5B-Q

The process described in EXAMPLE 5A was repeated batch-wise 16 more times for a total of seventeen times.

Example 5R

Preparation of Dried, Treated and Preserved Improved Meal

The resulting combined dispersed flour slurry from EXAMPLES 5A-Q was centrifuged to separate a liquid supernatant fraction and a solids fraction as a cake. The solid cake was flash-frozen in liquid nitrogen and the resulting frozen solids cake was freeze-dried, resulting in brittle flaky chunks. The freeze-dried solids were ground to a texture of crumbly flour. The freeze-dried solids in crumbly flour form were collected to achieve 15.8 pounds of treated flour. The 15.8 pounds of treated flour was further mixed with about 34.1 g of potassium sorbate and about 13.71 g of sodium benzoate to give a treated and preserved improved meal.

Example 6

Proximate Analysis and Determination of ANS Reduction Via Various Methods

Samples were obtained for ANS carbohydrate removal using mechanical extraction with water, chemical oxidation according to EXAMPLE 5A, and enzymatic hydrolysis according to EXAMPLE 3. Additionally, samples of soy milk were obtained before and after bacterial fermentation with *Lactobacillus*. All samples were dried and ground to a fine powder by using a coffee grinder (Severin, KM 3872, 230 V and 90 W, Severin Elektogerate GmbH, Sundern, Germany) prior to analysis. The proximate composition of the experimental feeds was determined, i.e. for moisture (oven-drying at 105° C. overnight), crude protein by CN analyser (Vario Max CN, Makro-Elementaranalysator, Element analysensysteme GmbH, Hanau, Germany) (N×6.25), fat by extraction, non-starch polysaccharides/carbohydrates or ANS, and ash (oven incineration at 480° C. overnight).

Figure 3:
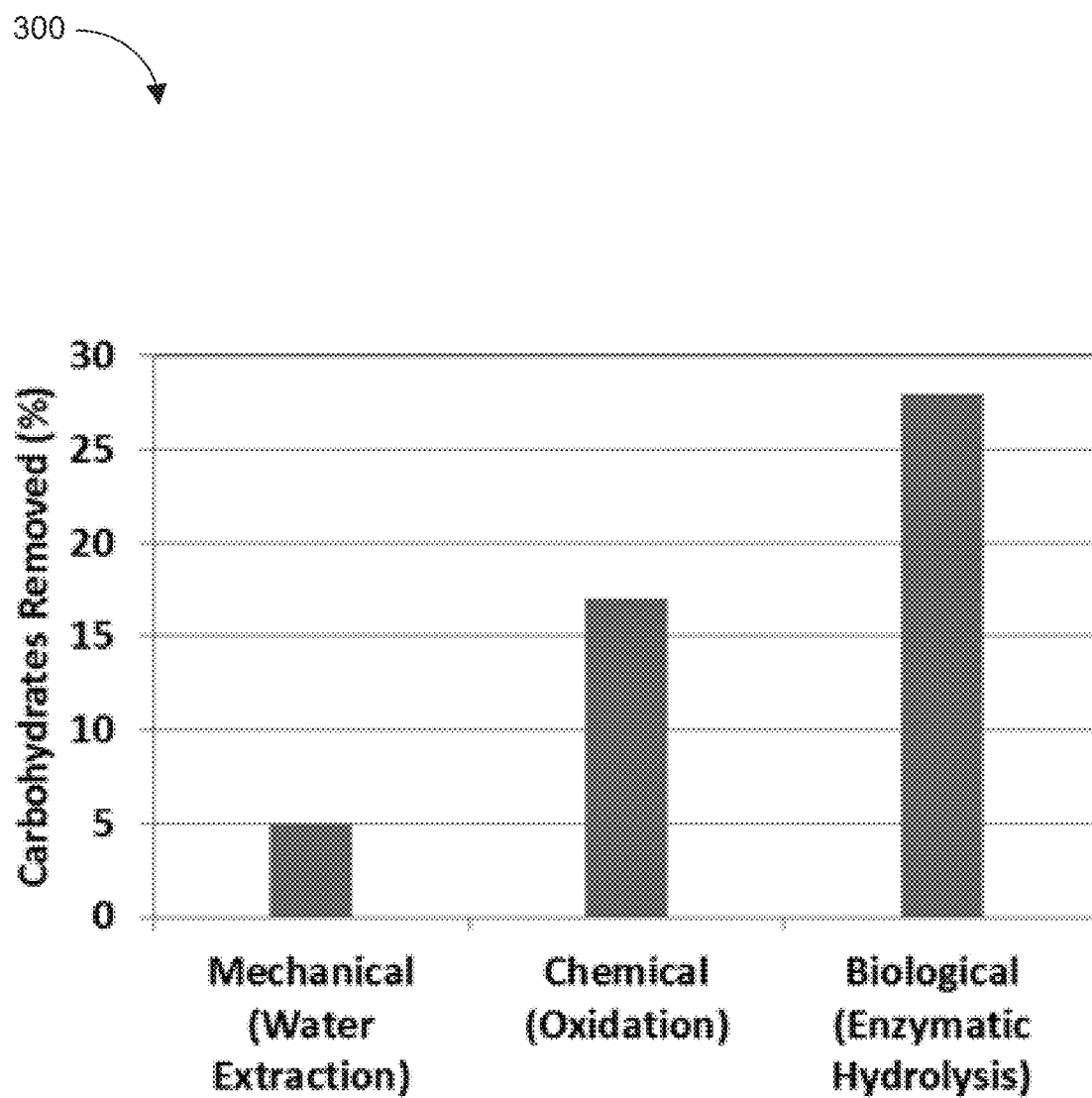
FIG. 3 is a graph 300 showing the relative weight fraction of ANS carbohydrates removed using mechanical extraction, chemical oxidation, and biochemical digestion via enzymatic hydrolysis.
Figure 4:
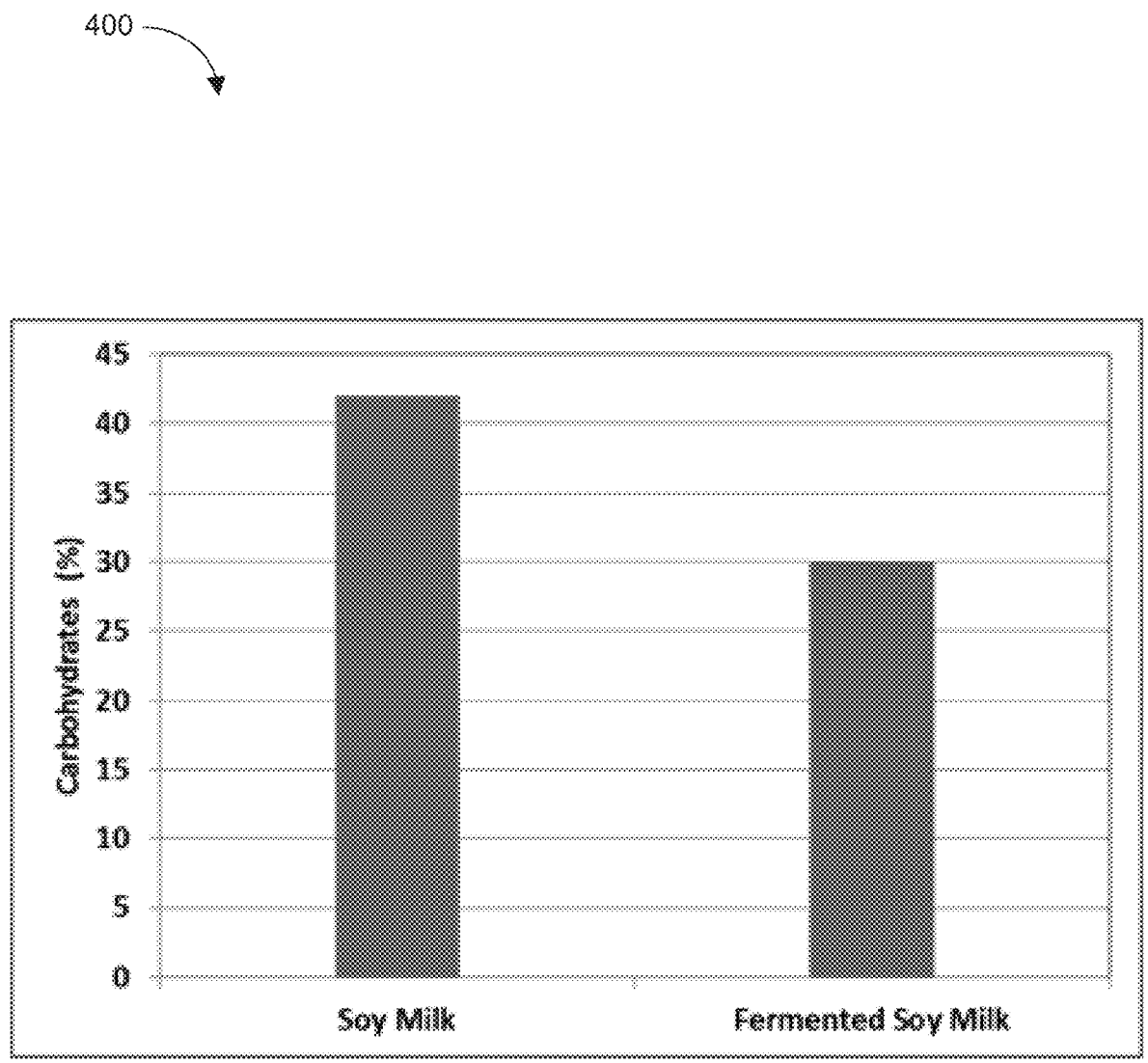
FIG. 4 is a graph 400 showing the weight fraction of ANS carbohydrates in soy milk before and after using biochemical digestion via bacterial fermentation with *Lactobacillus*.

FIG. 3 is a graph 300 showing the relative weight fraction of ANS carbohydrates removed using mechanical extraction (about 5 weight percent removed), chemical oxidation (about 15 weight percent or greater removed), and biochemical digestion via enzymatic hydrolysis (about 25 weight percent or greater removed). FIG. 4 is a graph 400 showing the weight fraction of ANS carbohydrates in soy milk before and after using biochemical digestion via bacterial fermentation with *Lactobacillus*. The total carbohydrate fraction of about 42 weight percent in fresh soy milk was reduced to about 30 weight percent in fermented soy milk; thus, the weight percent reduction according to biochemical digestion via bacterial fermentation was about 12 weight percent. The raffinose and stachyose content of the product meal is less than 0.5 weight percent.

Example 7

Comparative Feed Trial Results in Yellow Perch

Diets: Nine fish feed diets were prepared as described in FIG. 5, table 500, and FIG. 6, table 600 as follows. The control diet 1 was a conventional menhaden fish meal (IPC 740; International Proteins Corp., Minneapolis, Minn.) enriched with the listed ingredients: wheat meal (whole wheat meal from local supermarket); soy protein isolate (SUPRO_500E IP; Solae Europe S.A., 2, Chemin du Pavillon, CH-1218 Le Grand-Saconnex, Geneva, Switzerland; menhaden oil (Virginia Prime; Omega Protein, Inc., Reedville, Va.); soybean oil (Product number OF1870E; Consumers Supply Distributing, Sioux City, Iowa); vitamin premix (Test Diet, Land O'Lakes Purina Feed, Richmond, Ind.) including: pantothenic acid, 4,601 mg/kg; pyridoxine, 823 mg/kg; riboflavin, 3,000 mg/kg; niacin, 5,000 mg/kg; folic acid, 1,800 mg/kg; thiamin hydrochloride, 4,503 mg/kg; biotin, 500 mg/kg; vitamin B12, 200 µg/kg; choline, 50,001 mg/kg, menadione, 1,040 mg/kg; vitamin A, 96.1 international units (IU)/g; vitamin D3, 120 IU/g; vitamin E, 3,000 IU/kg; and ascorbic acid (L-ascorbyl-2-polyphosphate), 17,500 mg/kg; mineral premix (TestDiet, Land O'Lakes Purina Feed) including calcium, 8.00%; phosphorus, 8.00%; potassium, 5.00%; magnesium, 1.33%; sodium, 3.48%; chloride, 2.80%; fluorine, 144 mg/kg; iron, 1,600 mg/kg; zinc, 1,091 mg/kg; manganese, 276 mg/kg; copper, 126.2 mg/kg; cobalt, 248.1 mg/kg; iodine, 114.68 mg/kg; chromium, 8.0 mg/kg; molybdenum, 5.61 mg/kg; and selenium, 5.02 mg/kg); titanium doxide (Sigma-Aldrich, St Louis, Mo.); methionine (Merck KGaA, Darmstadt, Germany); and an enzyme cocktail (VISCOZYME®, Sigma-Aldrich, St. Louis, Mo.), including arabanase, cellulase, β-glucanase, hemicellulase, and xylanase.

Diet 2 was formed with 50% of the fish meal protein from diet 1 replaced by roasted soybean meal (RBSM). Diet 3 was formed with 100% of the fish meal protein from diet 1 replaced by RSBM. Diet 4 was formed with 50% of the fish meal protein from diet 1 replaced by RSBM and combined with the enzyme cocktail. Diet 5 was formed with 100% of the fish meal protein from diet 1 replaced by RSBM and combined with the enzyme cocktail. Diet 6 was formed with 50% of the fish meal protein from diet 1 replaced by soy protein concentrate (SPC), e.g., the improved meal. Diet 7 was formed with 100% of the fish meal protein from diet 1 replaced by SPC. Diet 8 was formed with 50% of the fish meal protein from diet 1 replaced by SPC, and combined with the enzyme cocktail. Diet 9 was formed with 100% of the fish meal protein from diet 1 replaced by SPC, and combined with the enzyme cocktail.

Yellow perch (*Perca flavescens*) were selected for trial and monitored for growth, nutrient and other performance attributes. The yellow perch (297; av wt.=11 g) were prepared in nine groups with three replicates. Each group was housed in a flow through system (18 inch tank). The water parameters were maintained at a water temp: 19-24° C., pH: 6.5-7.6, DO: 6.5-7.7). The fish were hand-fed 2-3% of body mass of the above diets, 4 times per day, for a period of 10 weeks.

Figure 7:
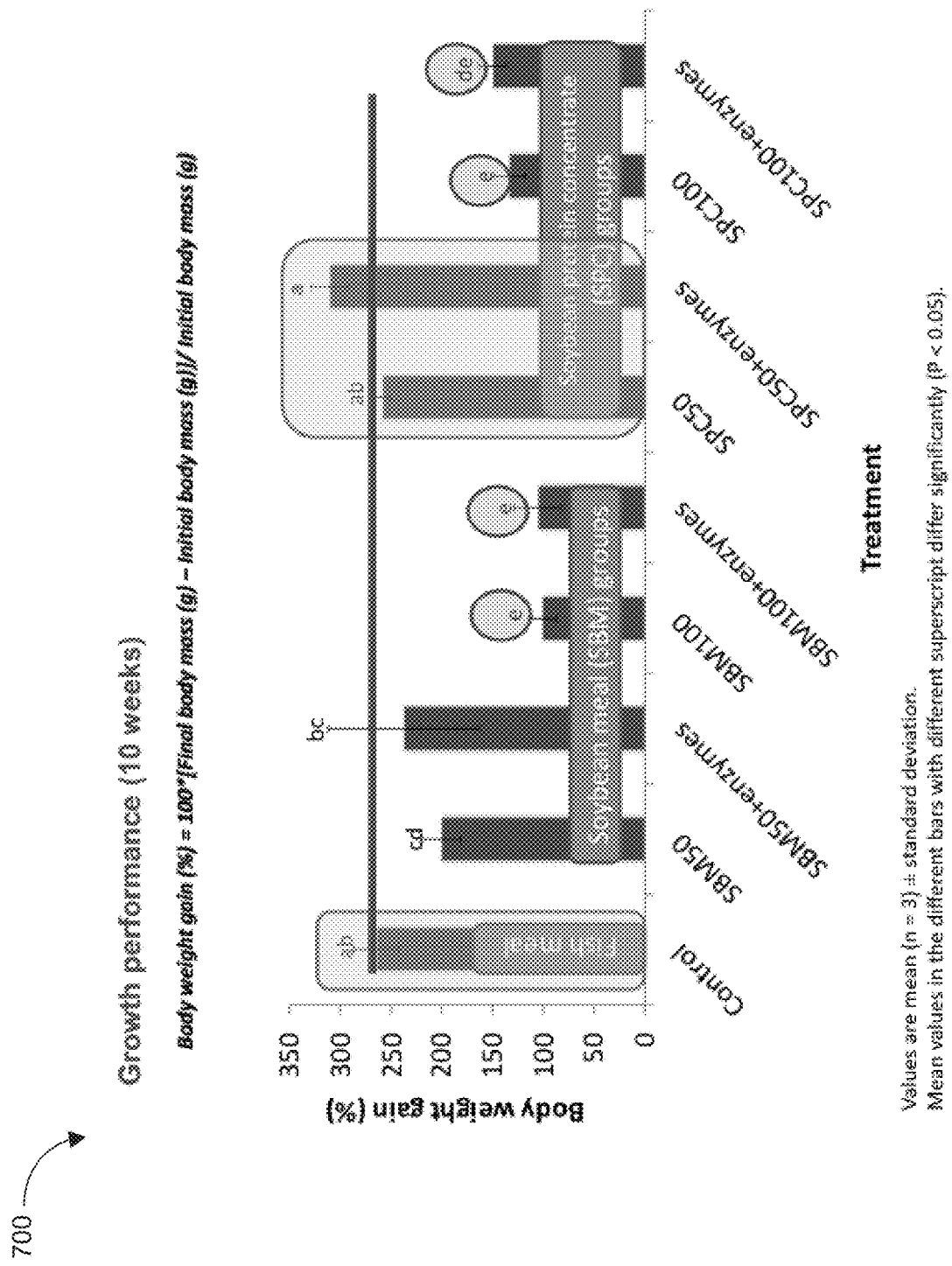
FIG. 7 is a graph 700 showing body weight gain in percent across various control and example diets.
Figure 8:
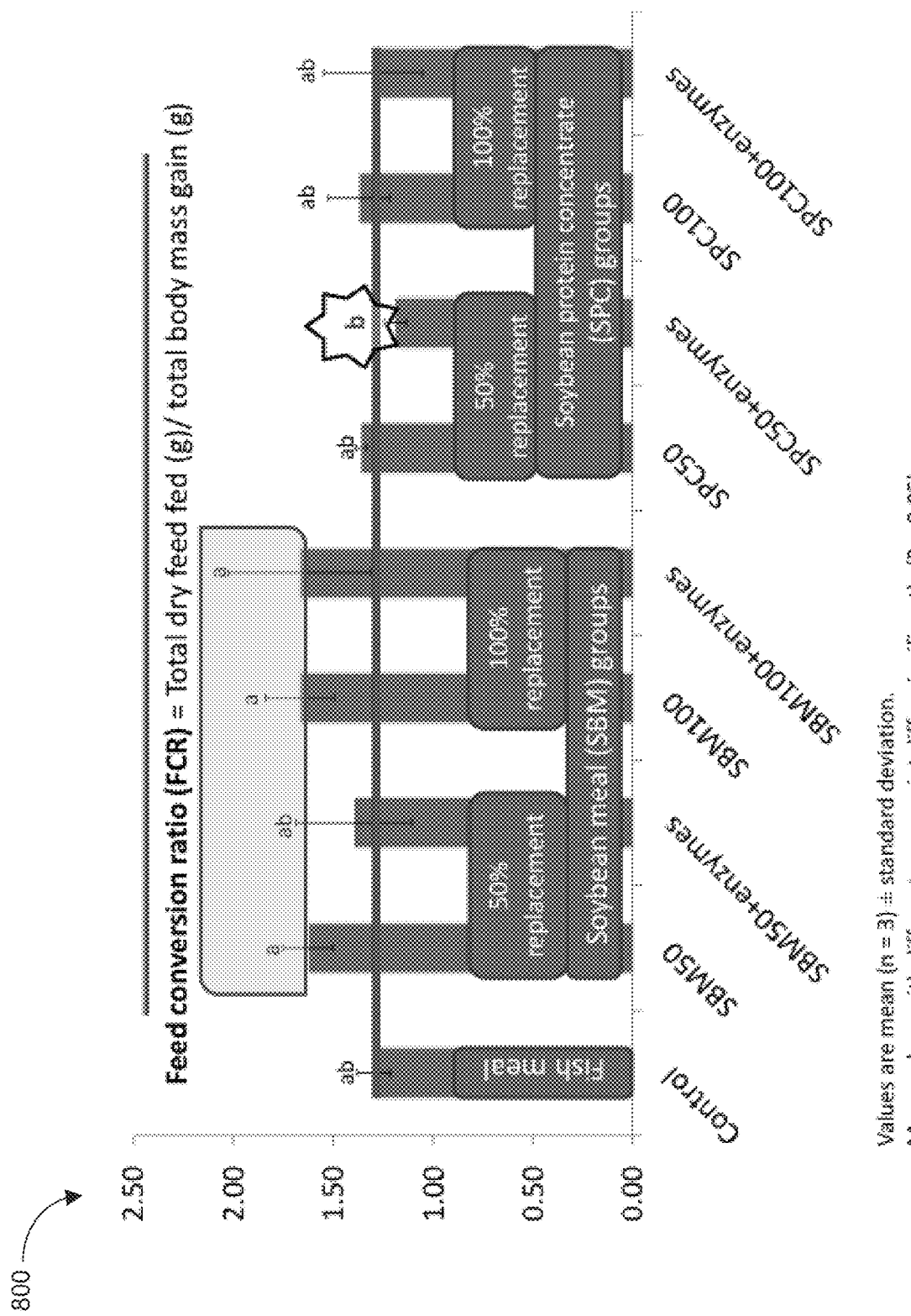
FIG. 8 is a graph 800 showing feed conversion ratios across various control and example diets.

FIGS. 7 and 8 are graphs 700 and 800 showing various results of this EXAMPLE. FIG. 7 depicts graph 700, showing body weight gain in percent across diets 1-9. Roasted soybean meal diets 2-5 showed lesser weight gain compared to control diet 1. Roasted soybean meal diets 2 and 3, with 50% of the fish meal protein from diet 1 replaced by RSBM, showed better performance than diets 4 and 5, respectively, with 100% of the fish meal protein from diet 1 replaced by RSBM. Further, diets 3 and 5, with addition of the enzyme cocktail, showed better performance, respectively, than diets 2 and 4, without the enzyme cocktail. Soy protein concentrate diets 6 and 7, with 50% of the fish meal protein from diet 1 replaced by RSBM, showed comparable performance to control diet 1 and better performance than diets 8 and 9, respectively, with 100% of the fish meal protein from diet 1 replaced by SPC. Further, diets 7 and 9, with addition of the enzyme cocktail, showed better performance, respectively, than diets 6 and 8, without the enzyme cocktail.

FIG. 8 depicts graph 800, showing body feed conversion ratios in total dry feed fed in g/total body mass gain in g across diets 1-9. Roasted soybean meal diets 2-5 showed less efficient feed conversion ratios compared to control diet 1. Roasted soybean meal diets 2 and 3, with 50% of the fish meal protein from diet 1 replaced by RSBM, showed better performance than diets 4 and 5, respectively, with 100% of the fish meal protein from diet 1 replaced by RSBM. Further, diets 3 and 5, with addition of the enzyme cocktail, showed slightly better performance, respectively, than diets 2 and 4, without the enzyme cocktail. Soy protein concentrate diets 6 and 7, with 50% of the fish meal protein from diet 1 replaced by RSBM, showed comparable performance to control diet 1 and comparable performance, respectively to diets 8 and 9, with 100% of the fish meal protein from diet 1 replaced by SPC. Further, diets 7 and 9, with addition of the enzyme cocktail, showed better performance, respectively, than diets 6 and 8, without the enzyme cocktail.

Based on this fish trial there is a potential to replace a portion of fish meal in aquaculture feeds. In this example, 50% to 100% of fish meal could be replaced compared to the control diet.

Prophetic Example 8

Feed Manufacturing

The treated and preserved flour from Examples 5A-5Q will be ground in a hammer mill through a 0.8-mm screen, mixed, preconditioned and extruded in a screw extruder equipped with a 1.0-2.0 mm die. The extrusion process will be optimized to obtain a bulk density >520 g/L in the pellets before drying, in order to facilitate slow sinking of the feed after drying. The pellets will be dried to 930 g/kg dry matter and then coated with cocktail enzymes using a mini-coater. The diets will be formulated to be equal in protein (~38% of wet basis), lipid (~10% of wet basis) and digestible energy (~21 MJ $kg^{-1}$), and designed to vary in the type and inclusion level of the protein source. The following feeds will be manufactured.

I. Control 1: Fish meal (major source of protein) based control diet.
II. Control 2: Roasted soybean meal (RSBM) based diets.
III. 50% fish meal protein replaced by RSBM.
IV. 75% fish meal protein replaced by RSBM.
Test feed 1: RSBM+enzymes (cocktail).
V. 50% fish meal protein replaced by test feed 1.
VI. 75% fish meal protein replaced by test feed 1.
Test feed 2: Soy bean meal (chemically oxidized).
VII. 50% fish meal protein replaced by test feed 2.
VIII. 75% fish meal protein replaced by inventive feed 2.
Test feed 3: Soy protein concentrate (chemically oxidized)+ enzymes (cocktail).
IX. 50% fish meal protein replaced by test feed 3.
X. 75% fish meal protein replaced by test feed 3.

Prophetic Example 9

Fish Feeding and Sampling

Feed-trained yellow perch fish (nos. 324, wt.~25-30 g) will be stocked into each of three flow-through tanks (replicates) for each diet feeding group (treatment and feed control), and be acclimated for two weeks before the experiment. Fish will be fed to satiation, and mortality will be monitored during the period of acclimation. Once experimental fish feed normally, the experiment will start with 12 fish per tank/replicate. During the experiment, all fish from each tank will be weighed individually each week. Throughout the experiment, fish will be fed the experimental diets using automated feeders delivering pellets from a conveyor into the tanks at programmed intervals. Feeding rates will be 2.5-3.0% of body weight (BW). Feed amounts will be calculated and adjusted weekly based on biomass estimates. Each diet will be fed to fish in duplicate tanks, and the fish will be fed three meals per day (08:00, 14:00 and 20:00 h). Water exchange rates in all tanks will be kept the same. Daily water temperature and DO will be recorded for each tank, and pH, ammonia and nitrite will be monitored weekly.

Uneaten feed will be sieved from the outlet water and feed intake will be monitored. At the beginning and the end of the experiments, fish from the tank will be euthanized with an overdose of MS-222, and stored at −20° C. for whole body proximate analyses and mineral compositions.

Prophetic Example 10

Proximate Analysis and Determination of ANS and Amino Acids

All samples will be ground to a fine powder by using a coffee grinder (Severin, KM 3872, 230 V and 90 W, Severin Elektogerate GmbH, Sundern, Germany) prior to analysis. The proximate composition of the experimental feeds and of the fish carcasses will be determined, i.e. for moisture (oven-drying at 105° C. overnight), crude protein by CN analyser (Vario Max CN, Makro-Elementaranalysator, Element analysensysteme GmbH, Hanau, Germany) (N×6.25), fat by extraction and ash (oven incineration at 480° C. overnight).

Trypsin inhibitor activity will be determined. Analysis of the lectin content will be conducted by haemagglutination assay. Phytate content of samples will be determined by a spectrophotometric procedure. Non-starch polysaccharides (NSP) will be determined. Amino acid composition of feed ingredients will be determined using an automated amino acid analyser after hydrolysing the samples with 6M HCl at 110° C. for 24 h. The sulphur-containing amino acids will be oxidised using performic acid before the acid hydrolysis. Tryptophan content of the above-mentioned samples will be determined spectrophotometrically.

Prophetic Example 11

Growth Performance and Nutrient Utilization

Parameters of growth performance and nutrient utilization will be determined as follows.

$$\text{Body mass gain (\%)} = [(\text{Final body mass} - \text{initial body mass})/\text{Initial body mass}] \times 100.$$

$$\text{Specific growth rate (g/day)} = [((\ln \text{ final body mass in g}) - (\ln \text{ initial body mass in g}))/\text{number of trial days}] \times 100.$$

$$\text{Metabolic growth rate (MGR, g kg}^{0.8} \text{ day}^{-1}) = (\text{Body mass gain in g})/[((\text{initial body mass in g}/1000)^{-0.8} + (\text{final body mass in g}/1000)^{-0.8})/2]/\text{number of trial days}.$$

The growth rate and body weight estimations will be calculated as thermal-unit growth coefficient (TGC)=100× $[(FBW^{1/3} - IBW^{1/3}) \times (\Sigma T \times D)^{-1}]$, FCR=dry feed fed (g)/body mass gain (g).

$$\text{Specific feed rate (\%)} = \text{SGR} \times \text{FCR}.$$

$$\text{Protein efficiency ratio} = \text{body mass gain (g)/crude protein fed (g); protein productive value (\%)} =$$

[(final fish body protein in g−initial fish body protein in g)/total protein consumed in g]×100.

Lipid productive value (%)=[(final fish body lipid in g−initial fish body lipid in g)/total crude lipid consumed in g]×100.

Energy productive value (%)=[(final fish body energy−initial fish body energy)/(gross energy intake)]×100.

Condition factor=[round weight (g)×100]/[fork length (cm)]$^3$; HSI, CSI, ISI (%)=[organ weight (g)/round weight (g)]×100.

Hepatosomatic index (HSI)=Liver mass (g)×100/body mass (g).

Intestinal somatic index (ISI)=Intestinal mass (g)×100/body mass (g).

Prophetic Example 12

Digestibility Measurement and Efficiency of Digestible Nutrients and Gross Energy Faeces collection will be qualitative, as the experimental diets will contain an inert marker (Titanium oxide, $TiO_2$). During last two weeks of the experiment, fish will be fed with a diet containing a marker ($TiO_2$) for digestibility measurement and faeces will be collected daily. After each feeding the aquaria will be controlled for remaining feed; generally, there will be no feed residues left. Every day prior to the faeces collection, aquaria will be siphoned out to clean any residues. Subsequently, faeces excreted by the fish will be collected in separate beakers for each aquarium by siphoning with a short small pipe. Faeces and surrounding water will be gently withdrawn from the aquaria immediately after excretion to minimize leaching of soluble components into water. The collected mixture of water and faeces will be centrifuged at 4000×g for 10 min, the supernatant will be discarded and the faeces will be then stored at −20° C. until analysis. For the analysis, faeces from all the experimental periods from the same fish will be pooled. The collected faeces will be centrifuged at 4000×g for 10 min, the supernatant discarded and the faeces will then be stored at −20° C. until analysis. Titanium dioxide in the feed and faeces will be determined. The percentage of apparent dry matter digestibility of diets will be calculated as: Apparent dry matter digestibility (%)=[1−{(% $TiO_2$ in feed)/(% $TiO_2$ in faeces)}]×100. Apparent digestibility coefficients (ADCs) of nutrients and energy of the experimental diets will be calculated. The nutrient and energy digestibility will be obtained using the following formula:

Apparent nutrient digestibility (%)=[1−{(% $TiO_2$ in feed)/(% $TiO_2$ in faeces)×(% Nutrient or energy in faeces)/(% Nutrient or energy in feed)}]×100.

Digestible nutrients and gross energy retained (%)= (Nutrient and energy retained in the whole body/Digestible nutrient and digestible energy)×100.

Digestible nutrients and energy=Total offered of nutrients and gross energy through feed×digestibility coefficient.

Prophetic Example 13

Metabolic and Digestive Enzymes Assay

Liver will be dissected from 2 fish of each replicate (6 fish/treatment) and transferred into liquid nitrogen for later analysis of alanine aminotransferase (ALAT, EC 2.6.1.2), aspartate aminotransferase (ASAT, EC 2.6.1.1), glutamate aminotransferase (GDH, EC 1.4.1.2), alkaline phosphates (AP, EC 3.1.3.1.) and lactate dehydrogenase (LDH, EC 1.1.1.27) activities. These enzymes will give valuable information on the liver function of the meal and protein concentrate fed animals.

The frozen liver sample will be homogenized with an Ultra Turrax in ice-cold buffer (20 mM Tris, 8 mM Mg $Cl_2$, 5 mM ethylenediamine tetraacetic acid (EDTA), 30 mM KCl, 2.5 mM dithioerythritol (DTE) and protease inhibitor (P 8340, 1 ml/20 g liver), pH 8.0) (1 g sample/9 ml buffer). Using commercial kits (ECOLINE®$^+$ VWR, Holzheim, Germany; Sigma Chemical Co., Darmstadt, Germany) activities of ALAT, ASAT, AP and LDH will be measured after centrifugation of the homogenates at 10,000×g for 15 min at 4° C. For measurement of GDH activity, the homogenates will be centrifuged at 10,000×g for 5 min at 4° C. The supernatant will then be exposed to ultrasound (100 W, 1 min) to break mitochondrial membranes and centrifuged at 10,000×g for 15 min at 4° C. The activity of GDH will be measured using a commercial kit (ECOLINE®S$^+$ VWR, Holzheim, Germany).

Intestine will be also dissected from 2 fish of each replicate (6 fish/treatment) and transferred into liquid nitrogen for later analysis of digestive enzymes. Amylase activity will be estimated using a dinitro-salicylic-acid (DNS) method. Amylase activity will be expressed as mmol of maltose released from starch per min at 37° C. Protease activity will be determined by a casein digestion method, and one unit of enzyme activity will be defined as the amount of enzyme needed to release acid soluble fragments equivalent to $\Delta 0.001 A_{280}$ per minute at 37° C. and pH 7.8. Lipase activity will be assayed, and one unit of enzyme will be the amount of enzyme that hydrolyses 1.0 micro equivalent of fatty acid from a triglyceride in 24 h at pH 7.7 at 37° C.

At the end of each experiment, 2 fish of each replicate (6 fish/treatment) will be anaesthetized by tricaine methanesulfonate (MS222) at 250 ppm in water. Blood will drawn near the caudal peduncle of the fish. Blood will be centrifuged at 1000×g for 5 min at room temperature (24° C.) to obtain plasma, which will then be stored at −20° C. for determination of physiological and biochemical parameters (glucose, cholesterol, triglycerides, phosphorus and calcium concentration). These parameters will be analyzed by VetScan Chemistry Analyzer (Scil Animal care company GmBh, Technischer service, Germany).

Prophetic Example 14

Hemato-Immunological Parameter Evaluation and Histology Assessment

RBC and WBC will be counted by a Neubauer's counting chamber haemocytometer. Care will be taken to avoid trapping of air bubbles. The RBC will be counted using a light microscope under high power (40×). The following formula will be used to calculate the number of RBC per $mm^3$ of the blood sample:

Number of RBC/mm$^3$=(N×dilution)/area counted× depth of fluid.

N=Number of cells counted

The Hb content of blood will be analyzed by Reflotron Hemoglobin test (REF 10744964, Roche diagnostic GmbH, Manheim Germany). Hematocrit will be determined on the basis of sedimentation of blood. Heparinised blood (50 μl) will be taken in a hematocrit capillary (Na-heparinised) and centrifuged in the Hematocrit 210 Hettich Centrifuge (Tuttlingen Germany) to obtain hematocrit values.

From analyses of Hct, Hb and RBC, the following parameters will be calculated:

Mean cell volume, MCV (fL)=(Hematocrit [%]× 1000)÷(RBC count [millions/μL]);

Mean cell hemoglobin, MCH (pg)=(Hemoglobin [g/dL]×10÷(RBC count [in millions/μL]) and Mean cell hemoglobin concentration, MCHC [g/dL] =Hemoglobin [g/dL]÷Hematocrit [%].

A Nobiflow cholesterin (kit lot number 60041889; Hitado Diagnostic system) and Nobiflow triglyceride-GPO (kit lot number 60040710) will be used to determine the plasma cholesterol and triglycerides respectively. The color intensity will be measured spectro-photometrically and it is expected to be proportional to the concentration of cholesterol and triglycerides in the plasma sample.

Fixed tissues (liver and intestines) will be submitted to dehydration processes following paraffin embedding (Aquagestion). Sections (5 μm) will be stained with hematoxylin and eosin (H & E) and will be examined under a light microscope. Micrographs will be examined "blind" by the same experienced pathologist. Liver sections will be evaluated for lipid degeneration levels (fatty change) and the integrity of the whole organ. Intestinal morphology will be evaluated according to the following criteria: a) widening and shortening of intestinal folds, 2) loss of supranuclear vacuolization in enterocytes in the intestinal epithelium, 3) widening of central lamina propria within the intestinal folds, and 4) infiltration of (mixed) leukocytes in the lamina propria and submucosa. The occurrence of histological changes for each dietary treatment will be analyzed by Kruskal-Wallis non-parametric Anova with InfoStat v 2009 (Ohio State University, Columbus, Ohio), with p<0.05 will be considered significant.

Prophetic Example 15

Gene Expression Analysis

Several biological processes will be interlinked and related to intestinal functions including immune- and stress-related processes, protein metabolism, energy and mitochondrial activity, lipid metabolism and transport. Therefore gene expression will be quantified in the intestines, liver and muscles. This analysis will be performed for the fish from the tank experiments.

The effects of nutritional factors on vertebrate growth and metabolism may be mediated by endocrine regulators, where growth hormone (GH) and insulin-like growth factor I (IGF-I) may play a central role. Growth response will be confirmed in term terms of gene expression, e.g., gene expression patterns viz. growth hormone (GH), insulin-like growth factor I (IGF-I). The stress caused by plant protein in yellow perch will be verified by determining a stress indicator parameter such as a heat shock proteins (HSPs). The generalized stress response at the cellular level may be in part mediated by the actions of a family of proteins known as HSPs. They may be distinguished by their molecular weight and the most extensively characterized of the heat shock proteins is a 70 kDa protein (HSP70) and also the most commonly induced stress protein in response to sub-optimal physiological conditions.

RNA isolation: RNA will be extracted from 100 mg of tissue by homogenization in 1 ml TRIZol (Invitrogen) using tungsten carbide beads (3 mm, Qiagen) and shaking (300 times per min) following the manufacturer's instructions. The RNA pellet will be washed in 500 μl 80% ethanol, air-dried and re-suspended in RNase-free H$_2$O. The concentration will be determined by spectrophotometry (Nanodrop ND1000, LabTech) and the integrity of the RNA will be determined by electrophoresis (Agilent Bioanalyser 2100). The RNA will then be stored at −80° until required.

Real-time PCR: The cDNA will be synthesized using 2 μg of total RNA. Real-time PCR will be performed on a number of genes to confirm the microarray analysis results using the same RNA samples. For cDNA synthesis, 2 μg of total RNA will be denatured (70° C., 3 min) in the presence of 1 μl of oligo-dT17 (500 ng/μl), left at room temperature for 5 min to allow for annealing, and then stored on ice. The resulting cDNA will be diluted to a final volume of 50 μl in RNA/DNA-free water. For real time PCR, 3 μl of cDNA will be used as a template with gene specific primers. A 2×iQ SYBR Green supermix will be used for qPCR, which will be performed in a 96-well plate using the DNA Engine OPTI-CON™ system (MJ Research, Inc., Waltham, Mass.).

Statistical analysis: Data from growth performance, nutrient utilization and health parameters will be subjected to a one-way analysis of variance ANOVA and the significance of the differences between means will be tested using Tukey's HSD (Honestly Significant Difference) test (P<0.05). Values will be expressed as means±standard deviation. Statistical analysis of the arrays will be performed using the Genespring GX analysis platform (version 9.5; Agilent Technologies, Santa Clara, Calif.). The qPCR measurements will be analyzed by T-test, performed using R software, with p<0.05 considered significant.

To the extent that the term "includes" or "including" is used in the specification or the claims, it is intended to be inclusive in a manner similar to the term "comprising" as that term is interpreted when employed as a transitional word in a claim. Furthermore, to the extent that the term "or" is employed (e.g., A or B) it is intended to mean "A or B or both." When the applicants intend to indicate "only A or B but not both" then the term "only A or B but not both" will be employed. Thus, use of the term "or" herein is the inclusive, and not the exclusive use. See Bryan A. Garner, A Dictionary of Modern Legal Usage 624 (2d. Ed. 1995). Also, to the extent that the terms "in" or "into" are used in the specification or the claims, it is intended to additionally mean "on" or "onto." To the extent that the term "selectively" is used in the specification or the claims, it is intended to refer to a condition of a component wherein a user of the apparatus may activate or deactivate the feature or function of the component as is necessary or desired in use of the apparatus. To the extent that the terms "coupled" or "operatively connected" are used in the specification or the claims, it is intended to mean that the identified components are connected in a way to perform a designated function. To the extent that the term "substantially" is used in the specification or the claims, it is intended to mean that the identified components have the relation or qualities indicated with degree of error as would be acceptable in the subject industry.

As used in the specification and the claims, the singular forms "a," "an," and "the" include the plural unless the singular is expressly specified. For example, reference to "a compound" may include a mixture of two or more compounds, as well as a single compound.

As used herein, the term "about" in conjunction with a number is intended to include ±10% of the number. In other words, "about 10" may mean from 9 to 11.

As used herein, the terms "optional" and "optionally" mean that the subsequently described circumstance may or may not occur, so that the description includes instances where the circumstance occurs and instances where it does not.

The various aspects and embodiments disclosed herein are for purposes of illustration and are not intended to be limiting, with the true scope and spirit being indicated by the following claims.

The invention claimed is:

1. An improved meal composition, comprising:
   a modified plant meal comprising:
      a plant meal comprising protein and one or more at least partially oxidized anti-nutritional substances (ANS); or
      a plant meal comprising protein and one or more ANS mixed with one or more enzymes without bacterial fermentation, the one or more enzymes selected from the group consisting of carbohydrase, arabanase, cellulase, β-glucanase, hemicellulase, xylanase, alpha galactosidase, and invertase;
   the improved meal composition being reduced in the one or more ANS by at least about 10 weight percent compared to unmodified plant meal; and
   a fish meal, the fish meal and the modified plant meal being in a dry matter weight ratio of between about 4:5 and about 5:4.

2. The improved meal composition of claim 1,
   the plant meal comprising an optionally roasted meal of one or more of: soybean, wheat, maize, millet, sorghum, barley, oats, rice, rye, teff, triticale, wild rice, buckwheat, amaranth, quinoa, chickpeas, common beans, common peas, fava beans, lentils, lima beans, lupins, mung beans, peanuts, pigeon peas, runner beans, cruciferous vegetables, and oil-expressed algal matter; and
   the one or more ANS comprising one or more of: oligosaccharides, arabinose xylose, galactose, glucose, sucrose, stachyose and raffinose.

3. The improved meal composition of claim 1 further comprising a preservative.

4. The improved meal composition of claim 3 wherein the preservative comprises one or more of sodium benzoate or potassium sorbate.

5. The improved meal composition of claim 1 wherein the one or more enzymes comprise one or more immobilized enzymes or microencapsulated enzymes.

6. The improved meal composition of claim 1 further comprising one or more amino acids.

7. The improved meal composition of claim 1 further comprising a vitamin premix or a mineral premix.

8. The improved meal composition of claim 1 further comprising titanium dioxide.

9. The improved meal composition of claim 1 wherein the one or more enzymes comprises alpha galactosidase.

10. The improved meal composition of claim 1 further comprising one or more of fish oil or soybean oil.

11. An improved meal composition, comprising:
    a modified plant meal comprising:
       a plant meal comprising protein and one or more at least partially oxidized anti-nutritional substances (ANS); or
       a plant meal comprising protein and one or more ANS mixed with one or more enzymes without bacterial fermentation, the one or more enzymes selected from the group consisting of carbohydrase, arabanase, cellulase, β-glucanase, hemicellulase, xylanase, alpha galactosidase, and invertase, wherein the one or more enzymes comprise one or more immobilized enzymes or microencapsulated enzymes;
    the one or more ANS comprising one or more of: oligosaccharides, arabinose xylose, galactose, glucose, sucrose, stachyose and raffinose.
    the improved meal composition being reduced in the one or more ANS by at least about 10 weight percent compared to unmodified plant meal;
    a fish meal, the fish meal and the modified plant meal being in a dry matter weight ratio of between about 4:5 and about 5:4;
    wherein the plant meal comprises an optionally roasted meal of one or more of:
    soybean, wheat, maize, millet, sorghum, barley, oats, rice, rye, teff, triticale, wild rice, buckwheat, amaranth, quinoa, chickpeas, common beans, common peas, fava beans, lentils, lima beans, lupins, mung beans, peanuts, pigeon peas, runner beans, cruciferous vegetables, and oil-expressed algal matter;
    optionally a preservative comprising one or more of sodium benzoate or potassium sorbate;
    optionally one or more amino acids;
    optionally a vitamin premix or a mineral premix;
    optionally titanium dioxide; and
    optionally one or more of fish oil or soybean oil.

12. An improved meal composition, comprising:
    a modified plant meal comprising:
       a plant meal comprising protein and one or more at least partially oxidized anti-nutritional substances (ANS) wherein:
          the plant meal comprises an optionally roasted meal of one or more of:
          soybean, wheat, maize, millet, sorghum, barley, oats, rice, rye, teff, triticale, wild rice, buckwheat, amaranth, quinoa, chickpeas, common beans, common peas, fava beans, lentils, lima beans, lupins, mung beans, peanuts, pigeon peas, runner beans, cruciferous vegetables, and oil-expressed algal matter; and
          the one or more ANS comprising one or more of: oligosaccharides,
       arabinose xylose, galactose, glucose, sucrose, stachyose and raffinose;
    the improved meal composition being reduced in the one or more ANS by at least about 10 weight percent compared to unmodified plant meal; and
    a fish meal, the fish meal and the modified plant meal being in a dry matter weight ratio of between about 4:5 and about 5:4.

13. The improved meal composition of claim 12 further comprising one or more of:
    a preservative comprising one or more of sodium benzoate or potassium sorbate;
    one or more amino acids;
    a vitamin premix or a mineral premix;
    titanium dioxide;
    fish oil: or
    soybean oil.

14. The improved meal composition of claim 1 wherein the one or more enzymes are selected from the group consisting of carbohydrase, arabanase, cellulase, β-glucanase, hemicellulase, xylanase, and invertase.

15. The improved meal composition of claim 11 wherein the one or more enzymes are selected from the group consisting of carbohydrase, arabanase, cellulase, β-glucanase, hemicellulase, xylanase, and invertase.

\* \* \* \* \*